United States Patent
Fujita et al.

(10) Patent No.: US 12,152,873 B2
(45) Date of Patent: Nov. 26, 2024

(54) LASER IRRADIATION APPARATUS, LASER IRRADIATION METHOD, CONTAINER, AND CONTAINMENT BODY

(71) Applicants: Kazuhiro Fujita, Tokyo (JP); Rie Hirayama, Kanagawa (JP)

(72) Inventors: Kazuhiro Fujita, Tokyo (JP); Rie Hirayama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/671,590

(22) Filed: Feb. 15, 2022

(65) Prior Publication Data
US 2022/0276042 A1 Sep. 1, 2022

(30) Foreign Application Priority Data

Feb. 26, 2021 (JP) .................................. 2021-029677

(51) Int. Cl.
*G01B 11/25* (2006.01)
(52) U.S. Cl.
CPC ........ *G01B 11/254* (2013.01); *G01B 11/2518* (2013.01)
(58) Field of Classification Search
CPC .......... B23K 2101/125; B23K 2103/42; B23K 26/0604; B23K 26/354; B23K 26/355; B23K 26/362; B23K 26/402; B41M 5/24; B41M 5/267; B65D 2203/00; B65D 3/28; G01B 11/2518; G01B 11/254
USPC ..................................................... 356/237.1
See application file for complete search history.

(56) References Cited

U.S. PATENT DOCUMENTS

| | | | | |
|---|---|---|---|---|
| 5,624,520 A | * | 4/1997 | Nedblake | B65C 9/1803 156/289 |
| 2010/0033548 A1 | * | 2/2010 | Kaneuchi | B41M 5/24 347/225 |
| 2012/0145229 A1 | | 6/2012 | Ji et al. | |
| 2013/0170846 A1 | * | 7/2013 | Kosasa | G03G 21/16 399/12 |

(Continued)

FOREIGN PATENT DOCUMENTS

| CN | 101758679 A | 6/2010 |
|---|---|---|
| CN | 208999814 U | 6/2019 |

(Continued)

OTHER PUBLICATIONS

International application No. PCT/JP2021/032372 filed Sep. 2, 2021, Masaaki Itoh, et al.

(Continued)

*Primary Examiner* — Sunghee Y Gray
(74) *Attorney, Agent, or Firm* — XSENSUS LLP

(57) ABSTRACT

A laser irradiation apparatus includes: multiple irradiation units each to emit a laser beam to a surface of a base to form a pattern, the multiple irradiation units, including: a first irradiation unit to emit a first laser beam; and a second irradiation unit to emit a second laser beam; and a circuitry to: control the first irradiation unit to irradiate only a first irradiation region on a surface of a base with the first laser beam; and control the second irradiation unit to irradiate only a second irradiation region on the surface of the base with the second laser beam. The first irradiation region and the second irradiation region are not overlapping each other.

20 Claims, 17 Drawing Sheets

(56) References Cited

U.S. PATENT DOCUMENTS

| | | | | |
|---|---|---|---|---|
| 2014/0046126 | A1* | 2/2014 | Gilligan | C12M 1/24 600/35 |
| 2016/0144457 | A1 | 5/2016 | Karsikas et al. | |
| 2021/0402805 | A1* | 12/2021 | Tamura | B41J 3/40733 |

FOREIGN PATENT DOCUMENTS

| | | | |
|---|---|---|---|
| CN | 209902475 U | | 1/2020 |
| CN | 211028573 U | | 7/2020 |
| DE | 10 2013 215 638 A1 | | 2/2015 |
| JP | 2001-147985 A | | 5/2001 |
| JP | 2009-279650 A | | 12/2009 |
| JP | 2015-160235 | | 9/2015 |
| JP | 6278451 B2 | | 2/2018 |
| JP | 2020079365 A | * | 5/2020 |
| JP | 2021-017248 A | | 2/2021 |
| WO | 2020/189276 A1 | | 9/2020 |
| WO | WO2021/117899 | | 6/2021 |

OTHER PUBLICATIONS

International application No. PCT/JP2021/035158 filed Sep. 24, 2021, Kazuhiro Akatsu, et al.
U.S. Appl. No. 17/500,968, filed Oct. 14, 2021, Hideji Miyanishi, et al.
U.S. Appl. No. 17/488,476, filed Sep. 29, 2021, Rie Hirayama, et al.
Extended European Search Report issued Oct. 6, 2022 in European Patent Application No. 22156142.6, 7 pages.
Chinese Office Action issued Feb. 27, 2024 in Chinese Patent Application No. CN202210169107.3.
Communication under Rule 71(3)EPC issued Mar. 20, 2024, in corresponding European Patent Application No. 22 156 142.6, 10pp.
Office Action issued Jul. 4, 2023 in European Patent Application No. 22 156 142.6, 6 pages.
Notice of Allowance issued Aug. 27, 2024 in corresponding Chinese Patent Application No. 202210169107.3.
Office Action issued Jul. 30, 2024 in corresponding Japanese Patent Application No. 2021-029677.

* cited by examiner

ADDITIONAL INFORMATION

| IDENTIFICATION NUMBER (TYPE) | WRITING CONDITION | IDENTIFICATION NUMBER OF PRINTING POSITION |
|---|---|---|
| A (CHARACTER) | ParaA | Pos5 |
| B (BARCODE) | ParaB | Pos4 |
| C (FIGURE) | ParaC | Pos1 |
| D (PHOTOGRAPH) | ParaD | Pos2 |
| E (IDENTIFICATION MARK) | ParaE | Pos3 |

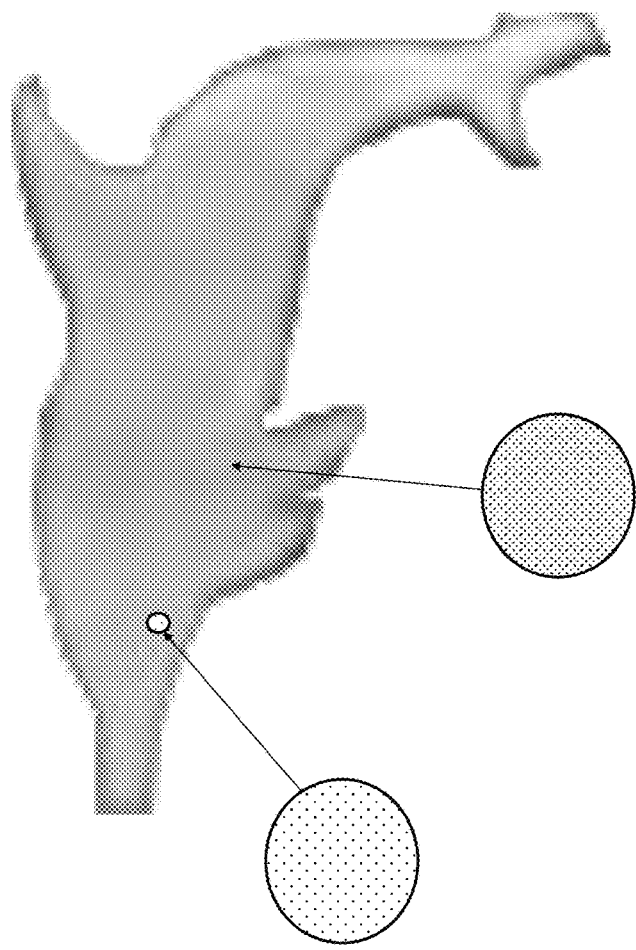
FIG. 9C
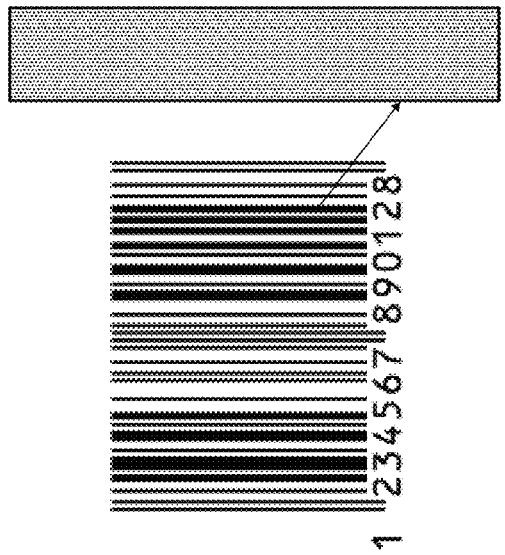
FIG. 9A
FIG. 9B
Name: Natural Mineral Water
Ingredients: Water (Mineral Water)
Collection Site: Kochi Pref. ***
Net: 500mL
Expiration Date: Printed on the bottle cap.
Storage: Keep away from direct sunlight.
Manufacturer ** CO., Ltd.
　　 Town Ward, Kanagawa Pref.
Factory unique code is printed next to Expiration date.

FIG. 10

| IMAGE DATA | IDENTIFICATION NUMBER (TYPE) | WRITING CONDITION | IDENTIFICATION NUMBER OF PRINTING POSITION | PRINTING AREA | EXPECTED PRINTING TIME |
|---|---|---|---|---|---|
| bottle | C (FIGURE) | ParaC | Pos1 | LARGE | 15 msec |
| (picture) | D (PICTURE) | ParaD | Pos2 | VERY LARGE | 20 msec |
| (PET mark) | E (IDENTIFICATION MARK) | ParaE | Pos3 | SMALL | 5 msec |
| (barcode) | B (BARCODE) | ParaB | Pos4 | MEDIUM | 30 msec |
| (label text) | A (CHARACTER) | ParaA | Pos5 | MEDIUM | 18 msec |

| WRITING UNIT | IRRADIATION REGION | SUBDIVIDED REGION | PRINTING TIME | TOTAL TIME |
|---|---|---|---|---|
| FIRST | FIRST | B (BARCODE) | 30 | 45 |
|  |  | C (FIGURE) | 15 |  |
| SECOND | SECOND | D (PICTURE) | 20 | 48 |
|  |  | A (CHARACTER) | 18 |  |
|  |  | E (IDENTIFICATION MARK) | 10 |  |

| WRITING UNIT | IRRADIATION REGION | SUBDIVIDED REGION | PRINTING TIME | TOTAL TIME |
|---|---|---|---|---|
| FIRST | FIRST | B (BARCODE) | 30 | 30 |
| SECOND | SECOND | D (PICTURE) | 20 | 30 |
|  |  | E (IDENTIFICATION MARK) | 10 |  |
| THIRD | THIRD | C (FIGURE) | 15 | 33 |
|  |  | A (CHARACTER) | 18 |  |

LASER IRRADIATION APPARATUS, LASER IRRADIATION METHOD, CONTAINER, AND CONTAINMENT BODY

CROSS-REFERENCE TO RELATED APPLICATIONS

This patent application is based on and claims priority pursuant to 35 U.S.C. § 119(a) to Japanese Patent Application No. 2021-029677, filed on Feb. 26, 2021, in the Japan Patent Office, the entire disclosure of which is hereby incorporated by reference herein.

BACKGROUND

Technical Field

The present disclosure relates to a laser irradiation apparatus, a laser irradiation method, a container, and a containment body.

Related Art

In a related art, a marking apparatus includes: first laser processing units as first marking units for marking a workpiece with a first dot size; second laser processing units as second marking units for marking the workpiece with a second dot size smaller than the first dot size; and an apparatus as a divided drawing pattern registration unit for dividing and registering a drawing pattern into a first drawing pattern drawn by the first laser processing units and a second drawing pattern drawn by the second laser processing units.

SUMMARY

Embodiments of the present invention provides a laser irradiation apparatus including: multiple irradiation units each to emit a laser beam to a surface of a base to form a pattern the multiple irradiation units, including: a first irradiation unit to emit a first laser beam; and a second irradiation unit to emit a second laser beam; and a circuitry to: control the first irradiation unit to irradiate only a first irradiation region on a surface of a base with the first laser beam; and control the second irradiation unit to irradiate only a second irradiation region on the surface of the base with the second laser beam. The first irradiation region and the second irradiation region are not overlapping each other.

Embodiments of the present invention provides a laser irradiation method including: controlling the first irradiation unit to irradiate only a first irradiation region on a surface of a base with the first laser beam to form a pattern in the first irradiation region; and controlling the second irradiation unit to irradiate only a second irradiation region on the surface of the base with the second laser beam to form a pattern in the second irradiation region. The first irradiation region and the second irradiation region are not overlapping each other.

Embodiments of the present invention provides a container including a base having patterns on a surface thereof. The patterns are formed by the laser irradiation apparatus or the laser irradiation method.

Embodiments of the present invention provides a containment body including the container and contents contained in the container.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 48 is a cross sectional view of a second modification of the dot;

FIG. 9A is an illustration of a subdivided region representing a barcode in FIG. 8A;

FIG. 9B is an illustration of a subdivided region representing characters in FIG. 8A;

FIG. 9C is an illustration of a subdivided region representing a picture in FIG. 8A;

FIG. 10 is a list of contents stored in a table of the circuitry;

FIG. 12A is a list of an example of steps of processing in the circuitry for two writing units;

FIG. 12B is a list of an example of steps of the circuitry for three writing units;

Figure 1:
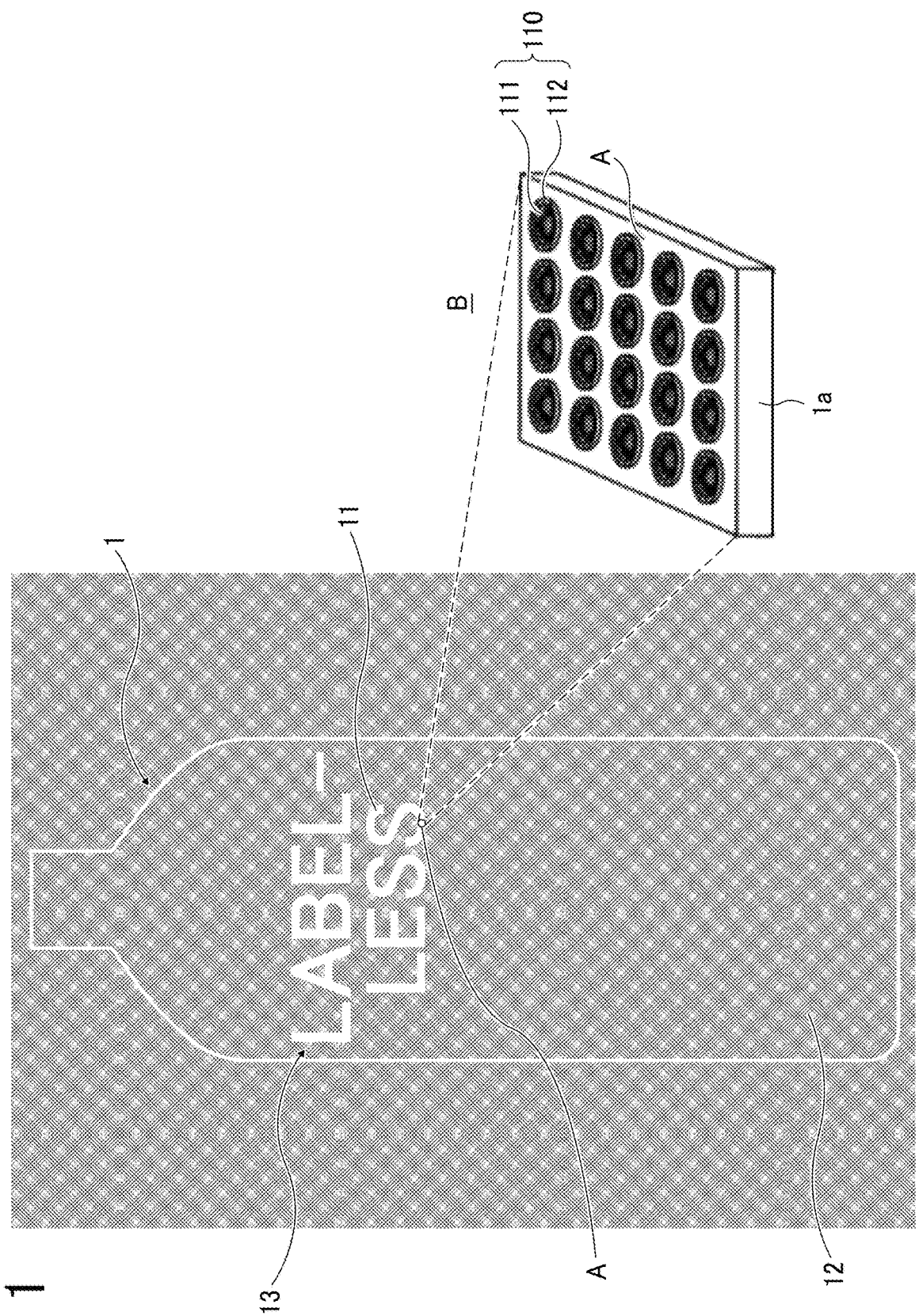
FIG. 1 is an illustration of a pattern formed on a base according to an embodiment of the present invention.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a." "an," and "the" are intended to include the plural forms as well, unless the context clearly indicates otherwise.

Embodiments of the present disclosure are described referring to the drawings. Like reference signs are applied to identical or corresponding components throughout the drawings, and redundant description thereof may be omitted. The embodiments described below are examples of apparatuses for embodying the technical idea of the present disclosure, and the present disclosure is not limited to the embodiments described below. Unless otherwise specified, shapes of components, relative arrangements thereof, and values of parameters described below are not intended to limit the scope of the present invention but are intended to exemplify the scope of the present invention. The relative positions of the elements illustrated in the drawings may be exaggerated for purpose of clear illustration.

In a base (base material) according to an embodiment of the present invention, a predetermined shape forming a pattern is formed on at least a partial area of the base. The base is a pan of a raw material of an object. The object is, for example, a container such as a bottle. Resin is used for making a container such as a plastic bottle. Specifically, resin is polyethylene terephthalate (PET). A plastic bottle (e.g., PET bottle) is used for containing drink. There is no specific limitation to the object, and the object may be any object. A shape of the container is not limited to that of a bottle and may be any shape. A material of the container is not limited to resin such as PET and may be any material.

"At least a partial area" of the base includes a region of a surface of the base. The surface of the base contacts with external air. In embodiments, the surface of the base is opposite to the inside of the base. If the base is a plate-shaped substrate, a front surface and aback surface of the base have no difference as the surface of the base excluding front and back. In the case of a cylindrical base, an outer surface of the base and an inner surface of the base have no difference as the surface of the base excluding outer and inner.

The pattern formed on a portion of the base includes a character, a code such as a barcode, a figure, or an image. Specifically, the pattern displays information of a name, an identification number, a manufacturer, or a manufacturing date on a container or contents to be stored in the container.

In a container such as a plastic bottle (e.g., PET bottle), there is a case where the information is displayed by attaching a recording medium (e.g., label) on which the information is recorded to a surface of the container. In contrast, according to the present embodiments, the information is displayed by forming a pattern displaying the information on the surface of a base of the container without using the recording medium (e.g., label).

Embodiments of the present invention achieve formation of a higher-quality pattern on a base with higher productivity.

FIG. 1 is an illustration of a pattern formed on a base according to the present embodiment. In FIG. 1, a portion of the base ta included in the container 1 on which a pattern 11 is formed. The container 1 may contain contents inside the container 1 to form a containment body. In other words, the containment body includes the container 1 and contents contained in the container 1. The base 1a of the container 1 is made of, for example, polyethylene terephthalate (PET), which is transparent to visible light. The base 1a of the container 1 is made of, for example, polyethylene terephthalate (PET), which is transparent to visible light. The lower limit of wavelength of the visible light ranges from approximately 360 nm to approximately 400 nm, and the upper limit thereof ranges from approximately 760 nm to approximately 1,600 nm.

In FIG. 1, the pattern 11 forms a character string of "LABEL-LESS" as an example. A perspective view B is an enlarged image of a part of the character "S" in the pattern 11 (i.e., an area A) for illustrating a fine structure of the pattern 11.

As illustrated in the perspective view B in FIG. 1, the area A includes multiple dots 110. The dot 110 is formed in at least a partial area of the base and is an example of a predetermined shape forming a pattern. The predetermined shape includes a shape formed on the surface of the base and an internal shape such as a void portion under the surface of the shape formed on the surface of the base.

The dot 110 is visually fogged and includes a concave portion 111 and a convex portion 112. The concave portion 111 is a portion recessed with respect to the surface of the base 1a forming the container 1 and is an example of a predetermined concave portion. The convex portion 112 is a portion protruding from the surface of the base 1a forming the container 1 and is an example of a predetermined convex portion. The convex portion 112 is formed around the concave portion 111 so as to surround the concave portion 111.

Multiple dots 110 are formed as an aggregate of dots on the base 1a of the container 1. The aggregate of multiple dots 110 forms a character string "LABEL-LESS" in the pattern 11. In other words, the aggregate of dots 110 forms the pattern 11.

Since multiple dots 110 are formed in the pattern region 13, a reflection direction and diffusibility of light incident on the container 1 are different from those of a non-pattern region 12. The pattern region 13 and the non-pattern region 12 are different from each other in at least one of light transmissivity and light reflectivity with respect to light incident on the container 1. Since at least one of the light transmissivity and the light reflectivity is different between the pattern region 13 and the non-pattern region 12, a person (viewer) who views the container 1 can visually recognize the pattern 11 formed on the container 1.

The overall width (i.e., dot width) of each of multiple dots 110 and a distance between multiple dots 110 (i.e., dot interval) are smaller than the dimension of the pattern 11. Accordingly, a person who views the container 1 can visually recognize the character "LABEL-LESS" of the pattern 11 without visually recognizing the dot 110 itself.

The distance between dots to prevent the dot 110 itself from being visually recognized varies depending on eyesight of a person who views the container 1, a distance between the eyes and the container 1. Preferably, the distance between the dots is 100 µm or less. The dot width (i.e., dot size) is preferably as small as possible. Specifically, the dot width is around 10 µm or less. If the dot width is less than around 100 µm, a person who views the dot is not able to recognize the shape of the dot. The distance between dots, the dot width (i.e., dot size) and eyesight are described in more detail.

When a person having eyesight of about 1.5 according to an eyesight test using a Landolt ring chart views the container 1 at a distance of about 30 cm from the container 1, a black-and-white dot (i.e., a black dot on a white background or a white dot on a black background) of 50 µm in the dot width can be generally recognized. As a contrast of the dot 110 is lower, a limit of the size of the dot 100 becomes larger. The size of dot 110 is around 50 µm. Depending on a condition, an isolated dot of 30 µm in the dot width can be visually recognized, or a dot of 10 µm in the dot width, which has a higher contrast, can be visually recognized in some cases.

In a case where two dots 110 are adjacent to each other, whether the two dots 110 can be visually recognized is determined by a resolution of human eyes. The resolution refers to the minimum distance that can be recognized as two dots separated from each other.

Depending on the eyesight, the resolution of the human eye is typically 100 µm at 30 cm from two dots. The distance of 30 cm corresponds to a distance at which information such as a label displayed on a plastic bottle (e.g., PET bottle) including drink is visually recognized when the plastic bottle is held by hand. In other words, when the plastic bottle is held in the hand with the elbow slightly bent, the distance between the human eye and the plastic bottle is about 30 cm. Considering individual differences, a range of the distance varies from 30 cm to 50 cm. The resolution is about 100 µm at 30 cm and about 160 µm at 50 cm from the plastic bottle.

As another criterion, if a distance between adjacent two dots is 130 µm or less, the two dots are visually recognized as being separated one by one. The criterion guarantees a resolution limit of 200 dots per inch (i.e., 200 dpi) is guaranteed.

As described above, by setting the distance between the dots to preferably 160 µm or less, more preferably 100 µm or less, the dots 110 are not visually recognized as being separated one by one. The dots are visually recognized as a continuous body, and a pattern such as a character or letter "LABEL-LESS" of the pattern 11 can be visually recognized as a pattern, a character or letter. If the size of a dot is larger than 10 µm, a change in the shape of the dot may be visually recognized as it is. Thus, by setting the size of the dots to preferably 160 µm or less and more preferably 100 µm or less, the dots can be visually recognized as a uniform pattern even if there is a change in the shape of the dot. A pattern such as characters, which is an aggregate of the dots, can be visually recognized as a uniform pattern without graininess.

In order to form the dot 110, various methods of processing such as laser processing, electric discharge processing, etching processing, cutting processing, or molding processing using a mold can be applied. Among these methods of processing, the laser processing is preferable because the laser processing can process a base 1a in a non-contact manner and can operate processing with a higher speed by scanning a laser beam, arraying a light source, or patterning exposure.

In the laser processing, the size, shape, and depth of the dot 110 can be changed by adjusting the optical energy of the laser beam (i.e., laser light beam) to be irradiated, a size of the laser beam, or irradiation time. Although an intensity distribution of the laser beam in a cross section is generally a Gaussian distribution, the intensity distribution can be changed by combining laser beams of an array light source or have a top-hat-shaped intensity distribution having a flat central intensity distribution by designing an irradiation optical system. In addition, it is preferable that an irradiation size of the laser beam is adjusted by the light source and the optical system and the irradiation size of the laser beam is substantially constant in processing. Hereinafter, the term "constant" is intended to mean that there is substantially no variation within a tolerance of the machining accuracy, and may include, depending on the machining accuracy, variations within the tolerance of about several percent.

The concave portion 111 of the dot 110 is formed by melting, burning, vaporizing, or deforming a portion of the base 1a at an irradiation position of the laser beam. The convex portion 112 is formed by adhering and solidifying a portion of the base 1a scattered from the concave portion 111 to the periphery of the concave portion 111 without burning or vaporizing. Since the laser processing is mainly operated using thermal energy, resins having a relatively lower thermal conductivity are suitable for the base 1a. Other materials such as glass are also used.

In addition, various shapes of the dot 110 are formed by controlling a thermal conductivity. In order to control the thermal conductivity, for example, the base 1a having higher thermal conductivity may be used or another material having higher thermal conductivity may be brought into contact with the base 1a to rapidly release the heat generated in the base 1a by the irradiation of the laser beam. Examples of the other member having a higher thermal conductivity include a cooling liquid (i.e., coolant) and a metal.

In addition, since a phenomenon such as melting, evaporation, crystallization, or foaming in laser processing occur irregularly in the irradiation region, the surface of the pattern region 13 becomes rough, and the surface roughness tends to be larger than that of the non-pattern region 12. Since the surface roughness is larger, the light diffusibility win the pattern region 13 with respect to incident light on the container 1 is higher than that in the non-pattern region 12 in the pattern region 13. As a result, the contrast of the pattern 11 is increased and the visibility is further improved. The application of laser processing is more preferable in terms of the surface roughness of the base and the contrast of the pattern.

In the present embodiment, since the pattern is formed by the aggregate of multiple dots 110 including at least one of the concave portion 111 and the convex portion 112, a surface area increases along the shapes of the concave portion 111 and the convex portion 112, and thus a region having a large surface roughness is further increased as compared to a case where the pattern is formed by grooves or pits as a lump. In addition, since the pattern is formed by the aggregate of multiple dots 110, the surface area is further increased along the shape of multiple dots 110. As a result, the light diffusibility is further increased, the contrast is increased, and the visibility is further improved.

In the example illustrated in the perspective view B (FIG. 1), an aggregate of multiple dots 110 are formed by being regularly arranged in a square lattice shape. The shape is not limited thereto. In some examples, multiple dots 110 in the aggregate may be arranged in a triangular lattice shape or a honeycomb shape or may be irregularly arranged at different intervals.

The pattern 11 including the character string "LABEL-LESS" is merely one example, and the pattern is not limited thereto. The pattern 11 may be formed by an arbitrary character string, a figure, a picture, a code such as a barcode or a QR Code®, or a combination thereof. In other words, the pattern 11 is an image, and a predetermined shape of the dot 110 forms an image.

An example of the structure of the dot 110 is described below.

Figure 2A:
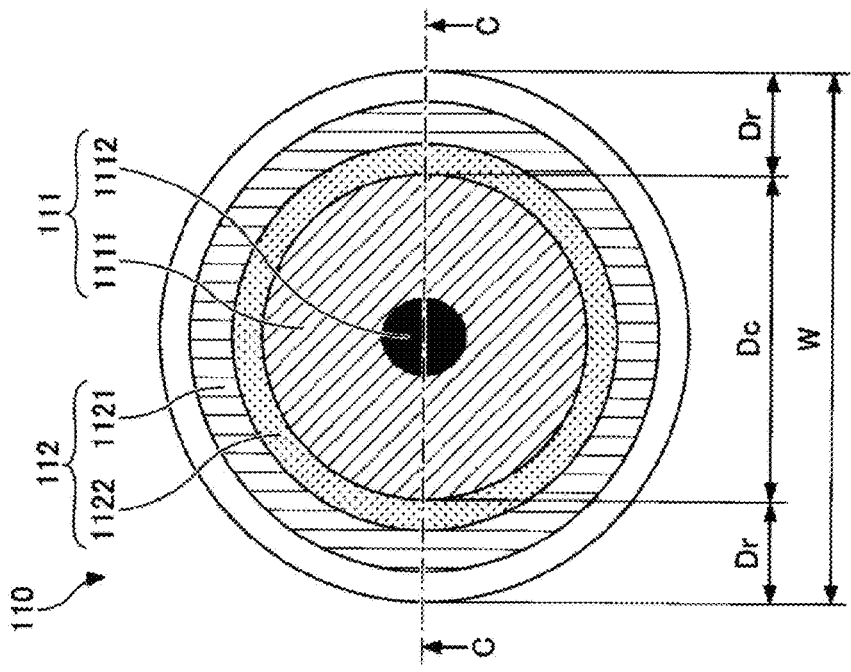
FIG. 2A is a top view of a dot of the pattern in FIG. 1 according to the present embodiment.
Figure 2A:
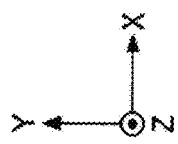
Figure 2B:
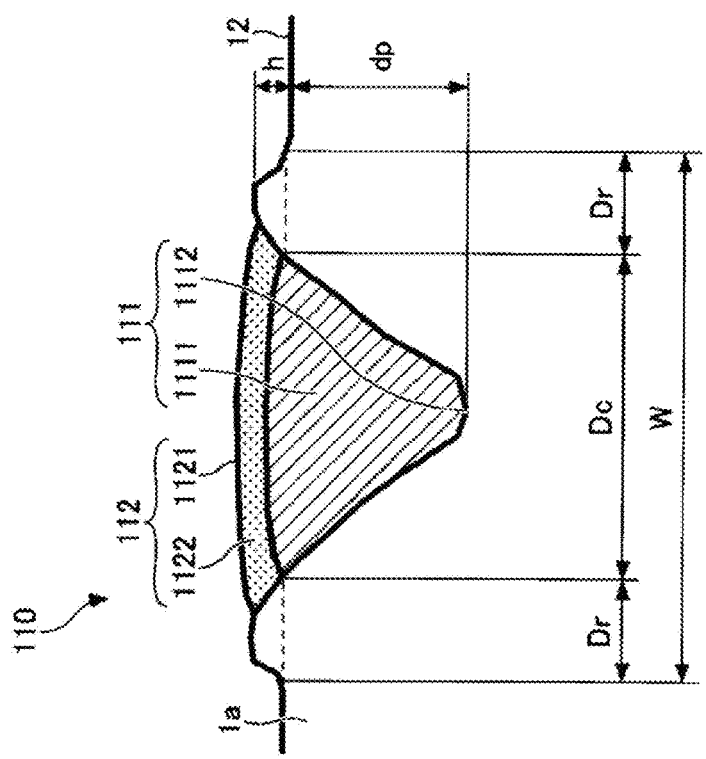
FIG. 2B is a cross-sectional view of the dot taken along a line C-C indicated by arrows in FIG. 2A.
Figure 2B:
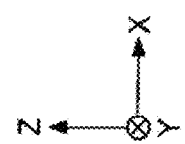
Figure 3A:
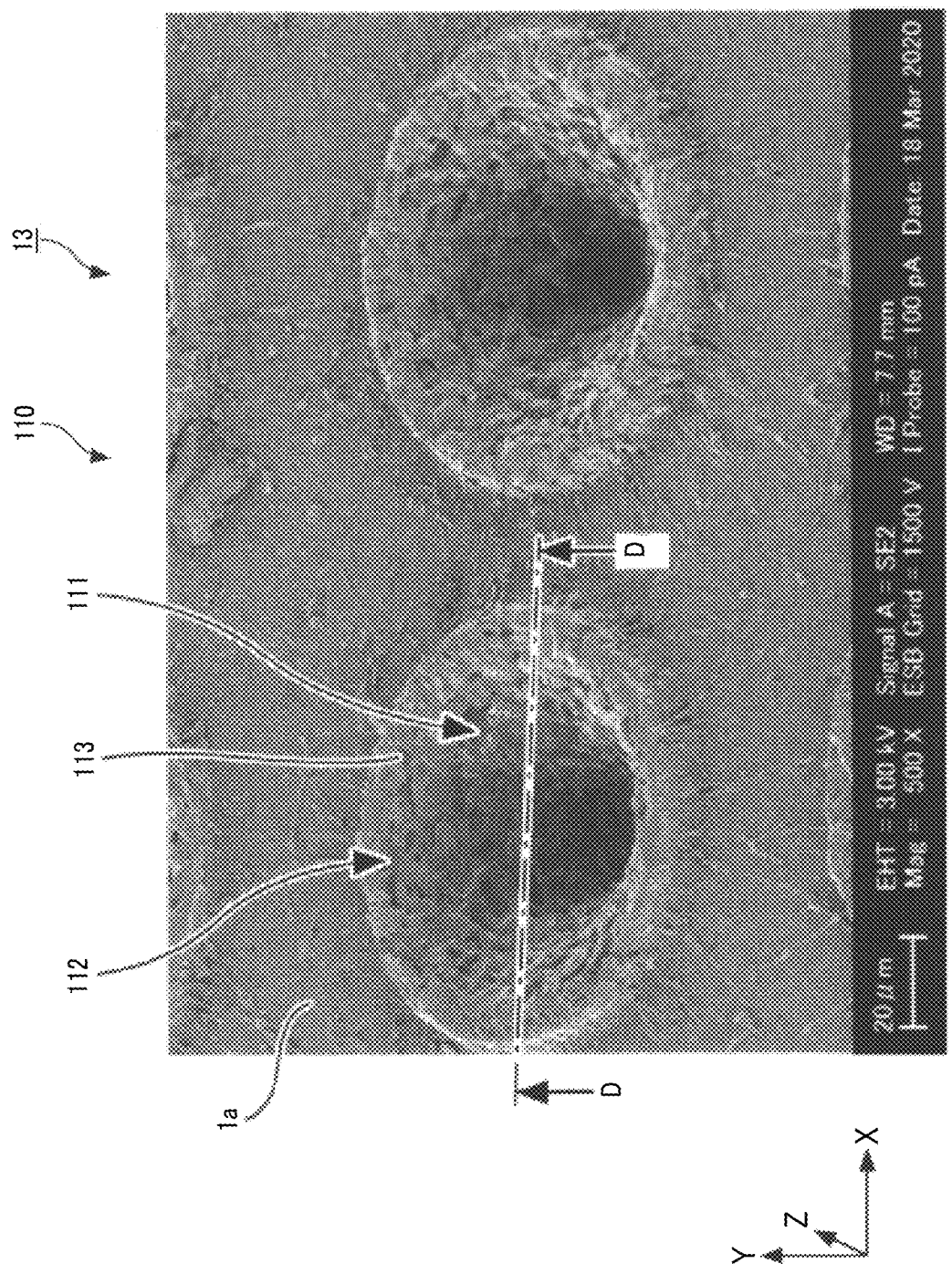
FIG. 3A is a perspective view of the dot taken by a scanning electron microscope (SEM) as viewed from above.
Figure 3B:
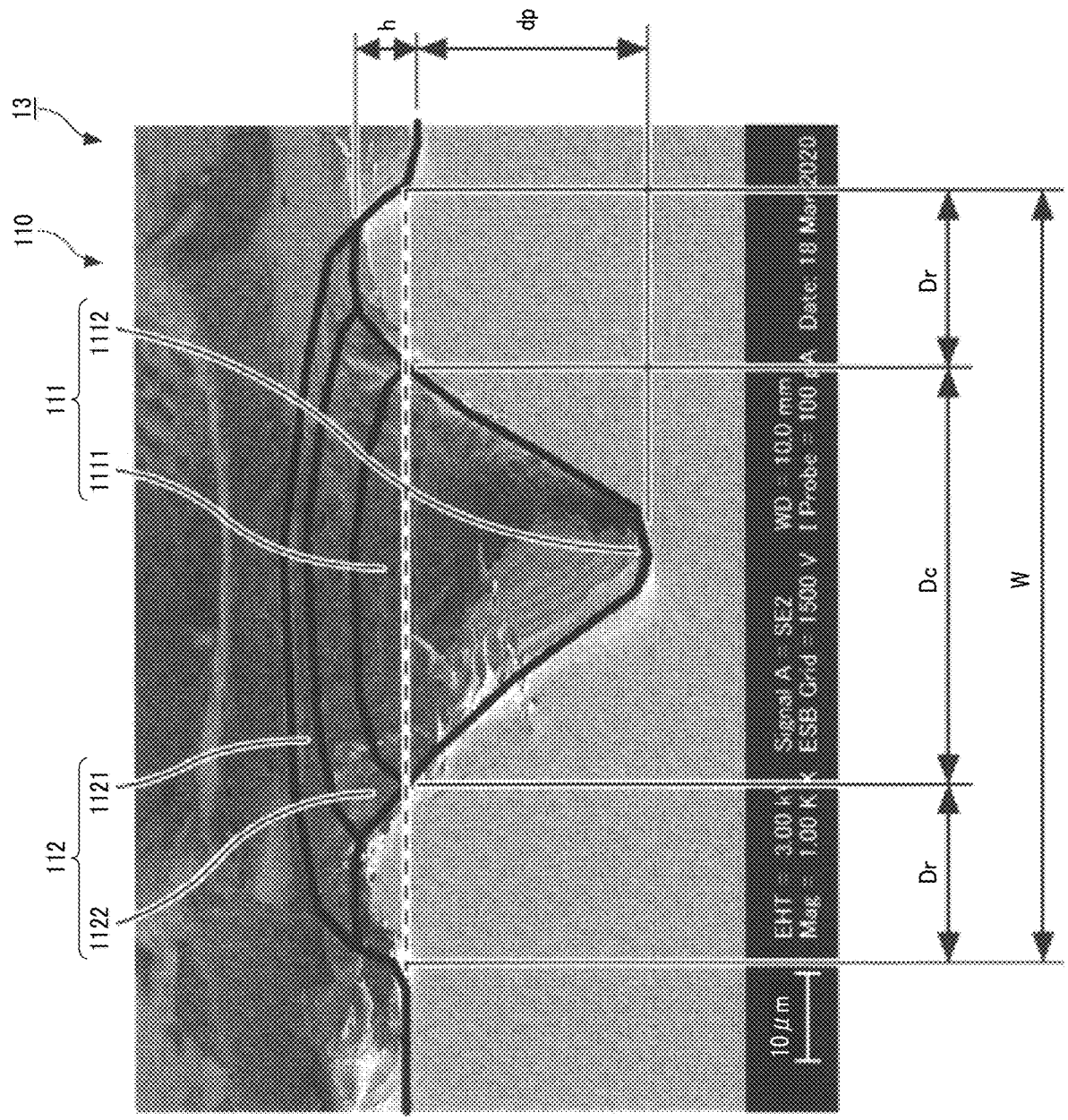
FIG. 3B is a perspective view of the dot taken along a line D-D indicated by arrows in FIG. 3A.

FIGS. 2A and 2B are illustrations of an example of a structure of the dot 110 according to the present embodiment. FIG. 2A is a top view of the dot 110 of the pattern in FIG. 1. FIG. 2B is a cross-sectional view of the dot 110 taken along line C-C indicated by arrows in FIG. 2A. FIGS. 3A and 3B are illustrations of scanning electron microscope (SEM) photographs of the dot 110 according to the present embodiment, in which FIG. 3A is a top view and FIG. 3B is a perspective view of the dot 110 taken along a line D-D indicated by arrows in FIG. 3A. FIGS. 3A and 3B are also the SME photograph obtained by magnifying and observing a part of the pattern region 13 (i.e., enlarged image of the pattern region 13). In FIG. 3A, whole two dots 110 of multiple dots 110 are observed, small parts of the two dots 110 are observed at a positive side of Y-axis (i.e., upper edge of the SME photograph), and slight parts of two dots 110 are observed at a negative side of Y-axis (i.e., lower edge of the SME photograph). A dot width is about 100 µm.

As illustrated in FIGS. 2A and 3B, each of the dots 110 includes a concave portion 111 and a convex portion 112. In FIGS. 2A and 2B, the concave portion III includes a first inclined surface 1111 (i.e., hatched region) and a bottom portion 1112 (i.e., blackened region), and is formed in a bowl shape. In FIGS. 2A and 2B, De represents the width of the concave portion 111, and the dp represents the height (i.e., a length in the Z-axis direction) of the bottom portion 1112 with respect to the surface of the non-pattern region 12.

The convex portion 112 includes a top portion 1121 (i.e., vertical hatched region) and a second inclined surface 1122 (i.e., dotted region), and is formed in an annular surface shape. An annular surface is obtained by rotating a circumference. In FIGS. 2A and 2B, Dr represents the width in the radial direction of the annular surface of the convex portion 112, and h represents a height (i.e., a length in the Z-axis direction) of the top portion 1121 with respect to the surface of the non-pattern region 12.

In FIGS. 2A and 2B, W represents an entire width of the dot 110. The first inclined surface 111 and the second inclined surface 1122 are a continuous surface. The continuous surface is made of an identical material and does not have a step.

As illustrated in FIG. 3A, an uneven portion 113 is formed on the surface forming each of the concave portion 11 and the convex portion 112, that is, the minute uneven portion 113 has a roughed surface. The uneven portion 113 is smaller than the concave portion and the convex portion each having a predetermined shape. The uneven portion 113 includes a concave portion and a convex portion each having a width smaller than the dot width W of the dot 110, and specifically includes a concave portion and a convex portion each having a width of about 1 µm to 10 µm.

As illustrated in FIG. 3A, processed pieces are scattered in a region between the dots 110 in response to processing of dot 110. The surface is roughened by these processed pieces. A surface roughness in the pattern region 13 is larger than that in the non-pattern region 12 due to the uneven portion 113 or a surface roughness caused by the processed pieces.

The dots 110 is formed, for example, by irradiating the base 1a with a laser beam to modify the surface of the base 1a. Specifically, one dot 110 is formed by condensing a laser beam on one point of the base 1a. Multiple dots 110 are formed by two dimensionally scanning with the laser beam. Alternatively, multiple dots 110 are formed by multiple laser beams emitted from multiple arrayed laser light sources. Alternatively, a mask having multiple light transmission openings corresponding to the positions of the dots 110 may be used. The mask on the base 1a is irradiated with a magnified laser beam, and multiple dots 110 are formed by one irradiation. The magnified laser beam passes through multiple light transmission openings corresponding to the positions of the dots 110.

Various laser light sources are used to emit a laser beam. Preferably, the laser light source emits a pulse laser beam of femtosecond, picosecond, or nanosecond. Examples of a solid-state laser light source include a YAG laser and a titanium sapphire laser. Examples of a gas laser include an argon laser, a helium-neon (He—Ne) laser, and a carbon dioxide laser. A semiconductor laser is also used as a laser light source, which is preferable in terms of small size. As another example of the solid-state laser light source, a fiber laser is used. The fiber laser uses an optical fiber which works as an amplifying medium and is a suitable example of a laser light source in terms of higher peak energy and small size.

Figure 4A:
FIG. 4A is a cross-sectional view of a dot according to a first modification of the dot.
Figure 4B:
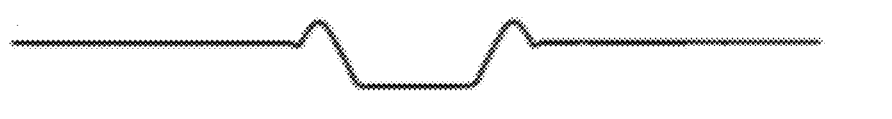
FIG. 4C is a cross-sectional view of a third modification of the dot.
FIG. 4D is a cross-sectional view of a fourth modification of the dot.

FIGS. 4A to 4D are illustrations of modifications of the dot according to the present embodiment. FIG. 4A is an illustration of a shape of the concave portion formed by evaporating the base 1a on the surface of the bottle. FIG. 4B is an illustration of a shape of the concave portion formed by melting the base 1a on the surface of the bottle. In FIG. 48, a peripheral edge portion of the concave portion has a raised shape as compared with FIG. 4A.

Figure 4C:
Figure 4D:
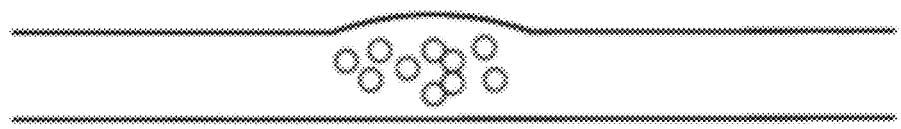

FIG. 4C is an illustration of a change in a state of crystallization on the surface of the base of the bottle. FIG. 4D is an illustration of a change in a state of foaming under the surface of the base of the bottle.

The pattern is formed by aggregating multiple dots. As described above, the dot is formed by changing the shape of the surface of the bottle, a property such as a state of crystallization of surface of the base, or a state of foaming under the surface of the base.

Such dots are gathered on the surface of the bottle and form a pattern. As a method of forming a concave portion by vaporizing the base on the surface of the bottle. For example, a pulse laser, which has a wavelength ranging from 355 nm to 1,064 nm and a pulse width ranging from 10 fs to 500 µs is, irradiated. In the method, a portion of the base irradiated with the pulse laser beam is evaporated, and a minute concave portion is formed on the surface of the base.

In addition, the base is melted, and the concave portion are formed by irradiating a continuous wave (CW) laser having wavelengths of 355 nm to 1.064 nm. The CW laser beam is kept irradiating after melting the base, and the surface or the lower surface of the base is foamed and fogged. In order to change the state of crystallization, for example, the base (e.g., PET) is irradiated with a CW laser having wavelengths of 355 nm to 1.064 nm to increase the temperature of the base rapidly, and the power is reduced to gradually cool the base. After increasing the temperature of the base (e.g., PET), the base (e.g., PET) is rapidly cooled by turning off the laser beam, the base (e.g., PET) becomes amorphous and transparent.

A change in a property of the base of the bottle is not limited to those illustrated in FIGS. 2 to 4. The properties of the base of resin may be changed by yellowing, oxidation, or surface modification. In addition, an absorber (i.e., conversion material) may be applied to a base in advance of the laser irradiation. The absorber absorbs an irradiated laser beam and converts light energy into thermal energy. By using the thermal energy, a concave portion or a convex portion on the base 1a is formed by heating control.

As described above, a smaller dot is formed as a minute modified mark by laser irradiation. A density of the dot can be changed by changing the distance between dots or a shape of the dot is also changed with a size smaller that a recognized size.

As an example, a smaller dot having substantially circular shape is described as a first pattern, but the first pattern is not limited thereto. The shape of the dot may be elliptical, oval, or linear. The shape of the first pattern may be any shape as long as the first pattern is difficult to recognize with the naked eye. The first pattern may be an aggregate of thin lines having a minute width.

Figure 5C:
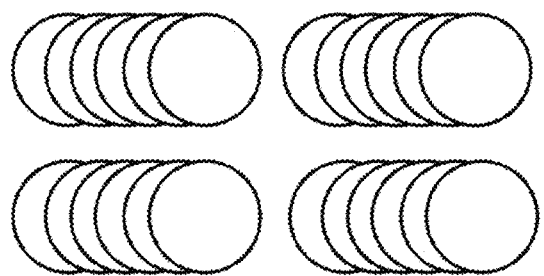
FIG. 5C is a top view of a third modification of an aggregate of the dots.
Figure 5B:
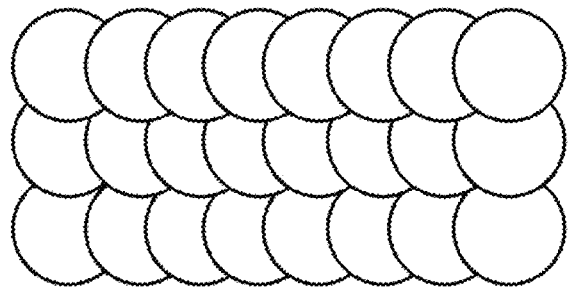
FIG. 5B is a top view of a second modification of an aggregate of the dots.
Figure 5A:
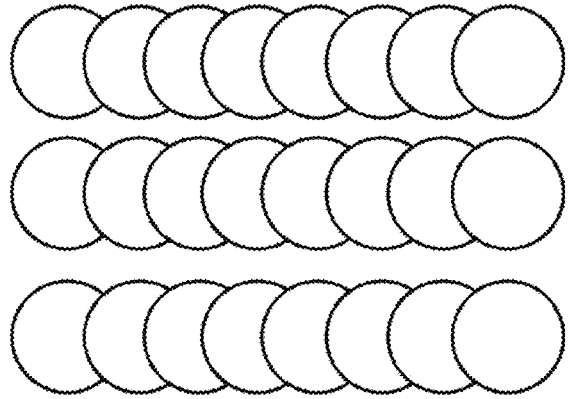
FIG. 5A is a top view of a first modification of an aggregate of the dots.

FIGS. 5A to 5C are illustrations of other modifications of the dot 110 according to the present embodiment. An aggregate of dots may be formed by overlapping dots as illustrated in FIG. 5A, may be formed by overlapping dots in both main and sub laser scanning directions as illustrated in FIG. 5B, or may be formed by arranging ovals by partially increasing the overlapping ratio as illustrated in FIG. 5C. With such modification of the dot, the amount of change in the transmittance or reflectance of the surface can be increased. This effectively allows an increase in contrast to the non-pattern region.

Figure 6:
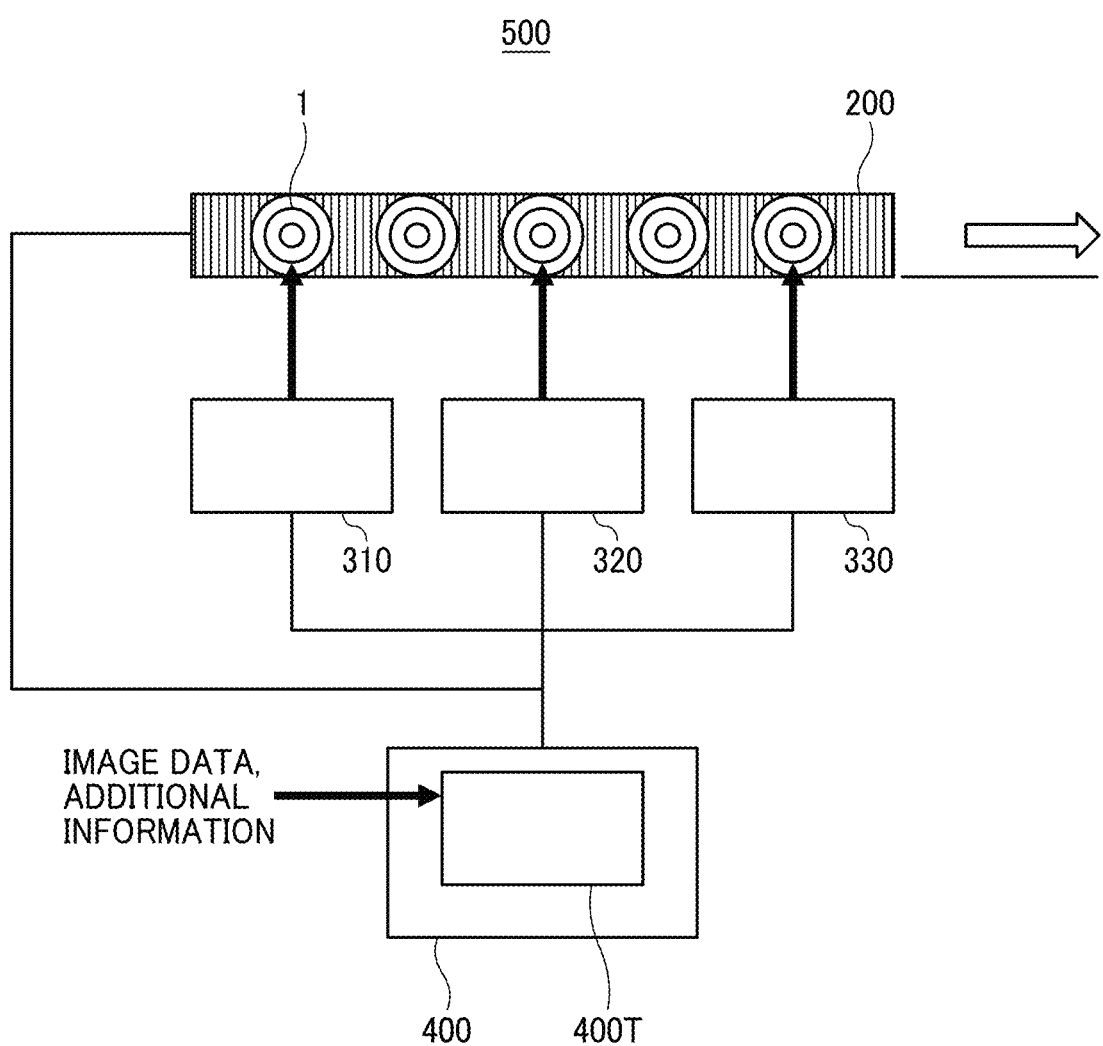
FIG. 6 is an illustration of a laser irradiation apparatus according to the present embodiment.

FIG. 6 is an illustration of a laser irradiation apparatus 500 (i.e., manufacturing apparatus) according to the present embodiment. A laser irradiation apparatus 500 illustrated in FIG. 6 is an example of a manufacturing apparatus and includes a manufacturing line 20 (i.e., conveying unit) that conveys containers 1 such as a bottle, multiple writing units 310, 320, and 330 (i.e., multiple irradiation units) that irradiate the containers 1 conveyed on the manufacturing line 200 with a laser beam, and a circuitry 400 (i.e., controller) that controls the writing units 310, 320, and 330 based on input image data and additional information.

The writing units 310, 320, and 330 are examples of multiple irradiation units (i.e., multiple laser irradiation units), including a first writing unit 310 (i.e., a first irradiation unit) which is an example of a first irradiation unit, a second writing unit 320 (i.e., a second irradiation unit) which is an example of a second irradiation unit, and a third writing unit 330 which is an example of a third irradiation unit.

A circuitry 400 includes a table 400T for storing and managing image information and additional information.

The multiple writing units 310, 320, and 330 (i.e., irradiation unit) respectively irradiate separate containers 1 with laser beams. The first writing unit 310 (i.e., the first irradiation unit) irradiates a first container 1 with a laser beam, the second writing unit 320 (i.e., the second irradiation unit) irradiates a second container 1 with a laser beam, and the third writing unit 330 (i.e., the third irradiation unit) irradiates a third container 1 with a laser beam.

Figure 7:
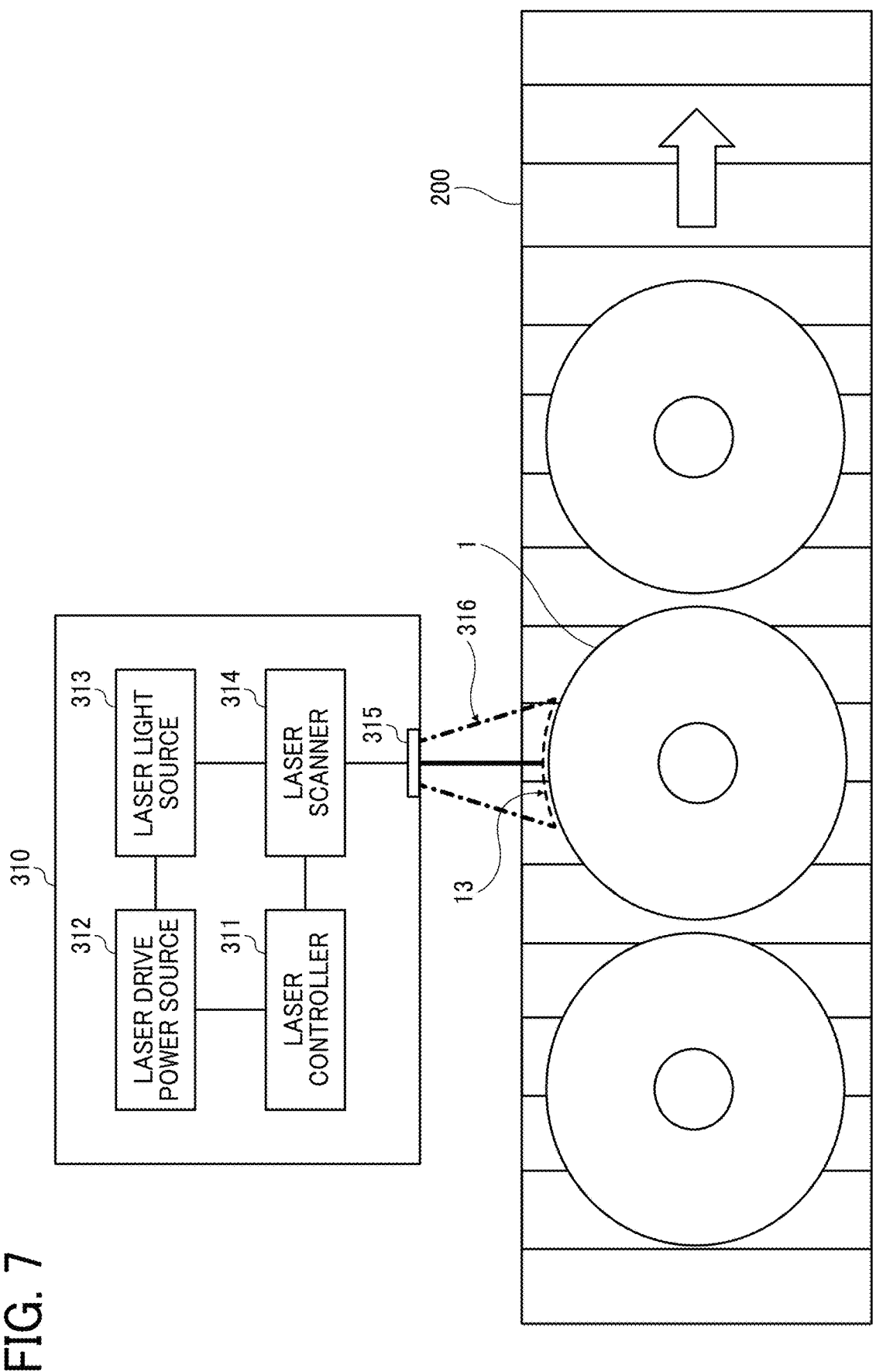
FIG. 7 is an illustration of processing of laser irradiation in the laser irradiation apparatus in FIG. 6.

FIG. 7 is an illustration of laser irradiation of the laser irradiation apparatus 500. In FIG. 7, the first writing unit 310 is described as an example of the writing unit (irradiation unit). The same applies to the second writing unit 320 and the third writing unit 330.

The first writing unit 310 includes a laser controller 311, a laser drive power source 312, a laser light source 313, a laser scanner 314, and a laser emission port 315, and irradiates the pattern region 13 of the container 1 such as a bottle with a laser beam 316.

The laser beam emitted from the laser emission port 315 marks a portion of the pattern region 13 as a point-like marking. For example, in a transparent base such as a plastic bottle (e.g., PET bottle), a diameter of the laser beam in a region where properties of the base are changed is preferably 1 µm or more and preferably 200 µm or less.

The laser controller 311 controls the laser drive power source 312 and the laser scanner 314 based on a control signal sent from the circuitry 400 illustrated in FIG. 6.

The laser light source 313 emits, for example, a pulse laser beam having an output power (i.e., light intensity) suitable for changing the properties of the pattern region 13 of the container 1.

The laser light source 313 emits a pulse laser beam having, for example, a wavelength of 532 nm, a pulse width of 16 picoseconds, and an average output of 4.9 W. Alternatively, the pulse laser beam may have a wavelength of from 355 nm to 1,064 nm and a pulse width of from 10 fs to 500 µs or less. The pulse laser beam is not limited thereto.

The laser light source 313 may include one laser light source or multiple laser light sources. When multiple laser light sources are used, the switching of ON and OFF and the frequency and the intensity of light emitted by the laser light source may be controlled independently for each laser light source or may be controlled in common.

The laser drive power source 312 drives the laser light source 313 based on a control signal sent from the laser controller 311. Thus, a switching of ON/OFF, a frequency, an intensity of the laser beam emitted from the laser light source 313 are controlled.

The laser beam of parallel light emitted from the laser light source 313 is expanded in a diameter by a beam expander and is incident on the laser scanner 314.

The laser scanner 314 scans the pattern region 13 of the container 1 such as a bottle with the laser beam emitted from the laser light source 313 based on a control signal sent from the laser controller 311.

The laser scanner 314 includes a scanning mirror that changes a reflection angle by a driving unit such as a motor. An incident laser beam is scanned in a direction perpendicular to the plane of drawing (FIG. 7) by changing the reflection angle of the scanning mirror, the scanning mirror is, for example, a galvano mirror, a polygon mirror, or a micro electro mechanical system (MEMS) mirror.

FIG. 7 is an illustration of an example in which the laser scanner 314 scans in one dimension with a laser beam in a direction perpendicular to the plane of the drawing sheet of FIG. 7, but the laser scanner is not limited thereto. The laser scanner 314 may perform two-dimensional scanning with laser beam in a plane by using a scanning mirror that changes a reflection angle in two orthogonal directions. A fiber coupling-laser diode array (FC-LDA) may also be used.

The laser scanner 314 may perform two-dimensional scanning by detecting a direction in which the container 1 such as a bottle is transported, or conveyed by the manufacturing line 200. A scanning speed may be apparently increased in cooperation with the two-dimensional scanning of the laser beam.

The laser controller 311 starts irradiation of laser beam based on a detection signal from a photodetector that detects the position of the container 1 such as a bottle transported by the manufacturing line 200. Accordingly, an irradiation position of the laser beam with respect to the container 1 such as a bottle transported by the manufacturing line 200 becomes accurate.

The container 1 is, for example, a cylindrical bottle, but is not limited thereto. The container 1 may be a rectangular bottle. In any case, if the relative position between the container 1 and the first writing unit 310 changes during irradiation of the laser beam, the quality of the pattern changes. To avoid the change in the relative position therebetween, a holder having a rotator may be provided to fix the container 1.

Figures 8A, 8B:
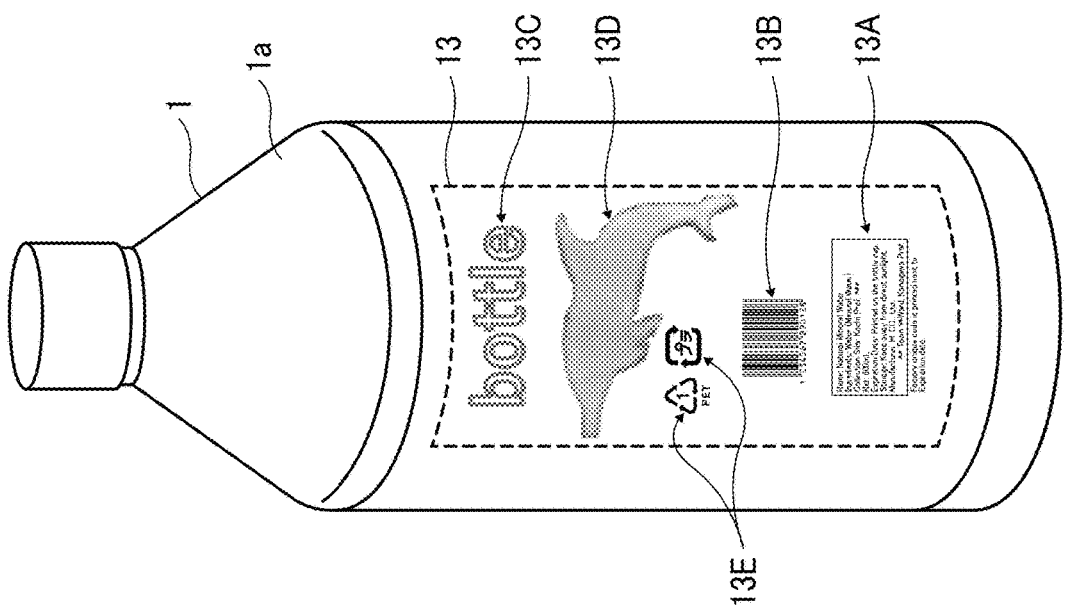
FIG. 8A is an illustration of a container having additional information.
FIG. 8B is a list of the additional information.

FIG. 8A is an illustration of a container 1 such as a bottle with additional information added by the laser irradiation apparatus 500 (i.e., manufacturing apparatus) illustrated in FIG. 6.

In FIG. 8A, a pattern region 13 is formed on the base 1a of the container 1. The pattern region 13 includes multiple subdivided regions such as a character region 13A, a barcode region 13B, a figure region 13C, a picture region 13D, and an identification mark region 13E. A pattern is formed on each subdivided region, and these patterns (the multiple subdivided regions 13A to 13E) do not overlap each other.

The character region 13A is a pattern indicating information such as a name, ingredients, a content, an expiration date, a storage condition, and a manufacturer, and indicate basically characters, numbers, and alphabets. The font size of the character region 13A may be 8 point (pt) or more.

The barcode region 13B is a pattern indicating numbers or characters in a form readable by a dedicated reading device (e.g., barcode reader) by a combination of bars and spaces, or a pattern indicating a two-dimensional barcode, or a QR Code®.

The figure region 13C is a pattern illustrating a figure without gradation. The picture region 13D is a pattern indicating a picture with gradation. The identification mark region 13E is a pattern indicating a recycling symbol or a logo.

For example, a thin line and a thick line in the barcode region 13B may be regarded as separate subdivided regions in which patterns are formed and which do not overlap each other.

Each of multiple subdivided regions has a notation purpose, and there is a quality standard of a pattern for achieving the notation purpose.

For example, the barcode region 13B is read by a barcode reader. In order to read the barcode region 13B correctly, the barcode region 13B involves a certain quality. Since the contrast of the barcode (i.e., contrast defined by black-and-white) is defined by standards, the barcode achieves the standards.

Since the character region 13A is basically a fine character or letter, if a display density is lower, a person is not able to recognize the fine character or letter.

By contrast, the identification mark region 13E and the figure region 13C may not have a higher quality for display. The picture region 13D and the figure region 13C are largely restricted in terms of design, but the quality of the pattern may not be so higher.

In the above description, quality of the pattern is generally described. Depending on an object forming the pattern, the quality of the pattern may vary.

In FIG. 8B, additional information including image information sets for the character region 13A, the barcode region 13B, the figure region 13C, the picture region 13D, and the identification mark region 13E is listed. The additional information in which the subdivided regions 13A to 13E are associated with the image information sets, respectively is input to the circuitry 400 illustrated in FIG. 6.

The additional information includes identification (i.e., type) information for identifying the character region 13A, the barcode region 13B, the figure region 13C, the picture region 13D, and the identification mark region 13E; writing conditions (i.e., pattern formation); and printing-position identification information. The writing conditions and the printing-position identification information are associated with the identification information.

FIGS. 9A to 9C are illustrations of subdivided regions according to the present embodiment. FIG. 9A is an illustration of a subdivided region representing the barcode region 13B in FIG. 8A. FIG. 9B is an illustration of a subdivided region representing the character region 13A in FIG. 8A. FIG. 9C is an illustration of a subdivided region representing the picture region 13D in FIG. 8A.

Each of FIGS. 9A to 9C is an aggregate of the extremely small multiple dots. For example, in the barcode region 13B, when a bar refers to a first pattern, a "first pattern is formed by the aggregate of dots. Hereinafter. "aggregate" is formed by multiple similar minutes elements (e.g., dot). A dot is also a second pattern. When the second pattern is arranged at a certain interval or distance, the first pattern is formed.

In addition, in the picture region 13D illustrated in FIG. 9C, a brighter portion formed by multiple dots and a darker portion formed by multiple dots are continuous in the picture region 13D. However, a density of multiple dots in the brighter portion and a density of the multiple dots in the darker portion are different. As a result, a gradation is expressed.

FIG. 10 is a list of contents stored in a table 400T of the circuitry 400. The table 400T of the circuitry 400 stores and manages identification (i.e., type) information, a writing conditions, identification information of a printing position, printing areas, and expected printing times in association with each of the character region 13A, the barcode region 13B, the figure region 13C, the picture region 13D, and the identification mark region 13E. "Hereinafter, "printing" is the same meaning as "writing".

The identification (i.e., type) information, the writing condition, and the identification information of printing position are stored as additional information illustrated in FIG. 8B. The printing area and the expected printing time stored in the Table 400T are calculated by the circuitry 400 based on the image data and the additional information. At least one of the printing areas and the expected printing time may be included in the additional information input to the circuitry 400.

As the expected printing time, for example, the figure region 13C of "bottle" is calculated as 15 msec (FIG. 10). The picture region 13D of a pattern of dolphin is a larger pattern but may not have a higher density. Thus, the expected printing time is calculated as 20 msec (FIG. 10). There are two kinds of identification mark regions 13E. The expected printing time of each identification mark region is calculated as 5 msec (FIG. 10). Since a contrast of black-and-white in the barcode region 13B increases to form a pattern having a higher density, it takes a longer time. The expected printing time is calculated as 30 msec (FIG. 10). Since the character region 13A does not have a higher quality so that a person can recognize, the expected printing time is calculated as 18 msec (FIG. 10).

Figure 11:
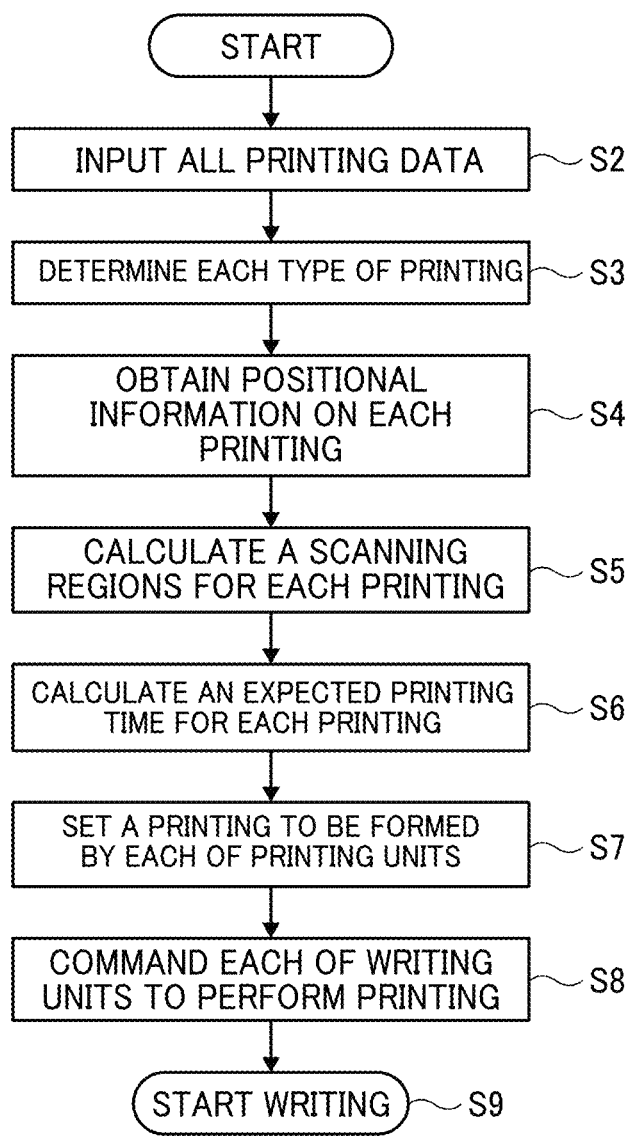
FIG. 11 is a flow chart representing steps of processing in the circuitry.

FIG. 11 is a flow chart of processing by the circuitry 400 illustrated in FIG. 6.

In response to a start of the processing, the circuitry 400 receives all printing (i.e., printing pattern) data including as image data and additional information (step S2).

The circuitry 400 determines each type of printing (i.e., printing pattern) (step S3) and obtains positional information on each printing (i.e., printing pattern) (step S4).

Based on the information obtained up to the step S4, the circuitry 400 calculates a scanning region for each printing (i.e., printing pattern) (step S5) and calculates the expected printing time for each printing (i.e., printing pattern)(step S6).

Based on the expected printing time calculated in step S6, the circuitry 400 sets a printing (i.e., printing pattern) to be formed by each of the writing units 310 to 330 (step S7), and commands each of the writing units 310 to 330 to perform printing (step S8). In step S9, each of the writing units 310 to 330 starts writing (pattern formation) by emitting a laser beam (step S9). The order of the steps of the processing in FIG. 11 are not limit thereto.

FIGS. 12A and 12B are lists of an example of processing operated by the circuitry according to the present embodiment.

In step S7 of FIG. 11, when one writing unit serves to form all the printing patterns, the total time for printing is 93 msec by simple integration (i.e., 15 msec for the figure region 13C, 20 msec for the picture region 13D, 10 msec for identification mark regions 13E (i.e., 5 msec×2 for two identification marks), 30 msec for the barcode region 13B, and 18 msec for the character region 13A according to FIG. 12A). Actually, additional time for changing each writing condition for each type is added.

FIG. 12A is a list of an example of the process in the step 7 (FIG. 1I) by the circuitry in case of using two writing units 310 and 320. FIG. 12B is a list of an example of the process in the step 7 (FIG. 11) by the circuitry in case of using three writing units 310, 320 and 330.

In FIG. 12A, the circuitry 400 sets the barcode region 13B and the figure region 13C as the first irradiation region to be irradiated by the first writing unit 310. Printing time by the first writing unit 310 is 30 msec for the barcode region 13B and 15 msec for the figure region 13C, thus the total time for printing per container is 45 msec.

In FIG. 12A, the circuitry 400 also sets the picture region 13D, the character region 13A, and the identification mark region 13E as the irradiation region to be irradiated by the second writing unit 320. Printing time by the second writing unit 320 is 20 msec for the picture region 13D, 18 msec for the character region 13A, and 10 msec (i.e., 5 msec×2 for two identification marks), thus the total time for printing per container is 48 msec.

The circuitry 400 calculates a combination of the printing patterns (i.e., printing regions) to be formed by the first writing unit 310 and the printing patterns (i.e., printing regions) to be formed by the second writing unit 320 to minimize the difference between the printing time by the first writing unit 310 and the printing time by the second writing unit 320, and stores the information illustrated in FIG. 12A in the table 400T.

In FIG. 12B, the circuitry 400 sets the barcode region 13B as the first irradiation region to be irradiated by the first writing unit 310. Printing time by the first writing unit 310 is 30 msec and the total time for printing per container is 30 msec.

In FIG. 12B, the circuitry 400 also determines that the second writing unit 320 irradiates the second irradiation region including the picture region 13D and the identification mark region 13E with the laser beam. Printing time by the second writing unit 320 is 20 msec for the picture region 13D and 10 msec (i.e., 5 msec×2 for two identification marks) for the identification mark region, thus the total time for printing per container is 30 msec.

The circuitry 400 also determines that the third writing unit 330 irradiates the third irradiation region including the figure region 13C and the character region 13A with the laser beam. Printing time by the third writing unit 330 is 15 msec for the figure region 13C and 18 msec for the character region 13A, thus the total time of printing per container is 33 msec.

The circuitry 400 calculates a combination of the printing patterns (printing regions) to be formed by the first writing unit 310 and the printing patterns (printing regions) to be formed by the second writing unit 320 to minimize the difference between the printing time by the first writing unit 310 and the printing time by the second writing unit 320, and stores the information illustrated in FIG. 12A in the table 400T.

As described above, since the first to third irradiation regions include subdivided regions that do not overlap each other, the first to third irradiation regions do not overlap each other.

The circuitry 400 sets the first irradiation region to be irradiated with a laser beam by the first writing unit 310 to and the second and third irradiation regions not to be irradiated with a laser beam by the first writing unit 310.

The circuitry 400 sets the second irradiation region to be irradiated with a laser beam by the second writing unit 320 to and the first and second irradiation regions not to be irradiated with a laser beam by the second writing unit 320 and sets the third irradiation region to be irradiated with a laser beam by the third writing unit 330 to and the first and second irradiation regions not to be irradiated with a laser beam by the third writing unit 330.

As described above, the circuitry 400 determines the subdivided region in the first irradiation region irradiated with the laser beam by the first writing unit 310 and the subdivided region in the second irradiation region irradiated with the laser beam by the second writing unit 320 for subdivided regions 13A to 13E.

Thus, the circuitry 400 determines that the first irradiation region includes a subdivided region for a pattern suitable for the first writing unit 310 and the second irradiation region includes a subdivided region for a pattern suitable for the second writing unit 320 among multiple subdivided regions 13A to 13E.

The circuitry 400 determines a subdivided region in the first irradiation region and a subdivided region in the second irradiation region among multiple subdivided regions 13A to 13E so that a difference between a laser irradiation time in which the first writing unit 310 irradiates the first irradiation region with a laser beam and a laser irradiation time in which the second writing unit 320 irradiates the second irradiation region with a laser beam is minimized. As a result, the total time forming patterns in multiple subdivided regions 13A to 13E is minimized.

The circuitry 400 may set the first writing unit 310 so as to form a pattern that has higher-accuracy and takes a longer-time to form and may set the second writing unit 310 so as to form a pattern that does not have a higher accuracy and takes a shorter-time to form.

The circuitry 400 determines that the first irradiation region includes a subdivided region for a pattern having a higher quality and the second irradiation region includes a subdivided region for a pattern formed with a higher speed among multiple subdivided regions 13A to 3E illustrated in FIG. 12. As a result, a pattern having a higher accuracy is formed in the subdivided region in the first irradiation region, and a pattern is formed at higher speed in the subdivided region in the second irradiation region.

Although the first and second writing units 310 and 320 have been described above, the same applies to a case where a large number of writing units such as the third writing unit 330 are provided.

Figure 13:
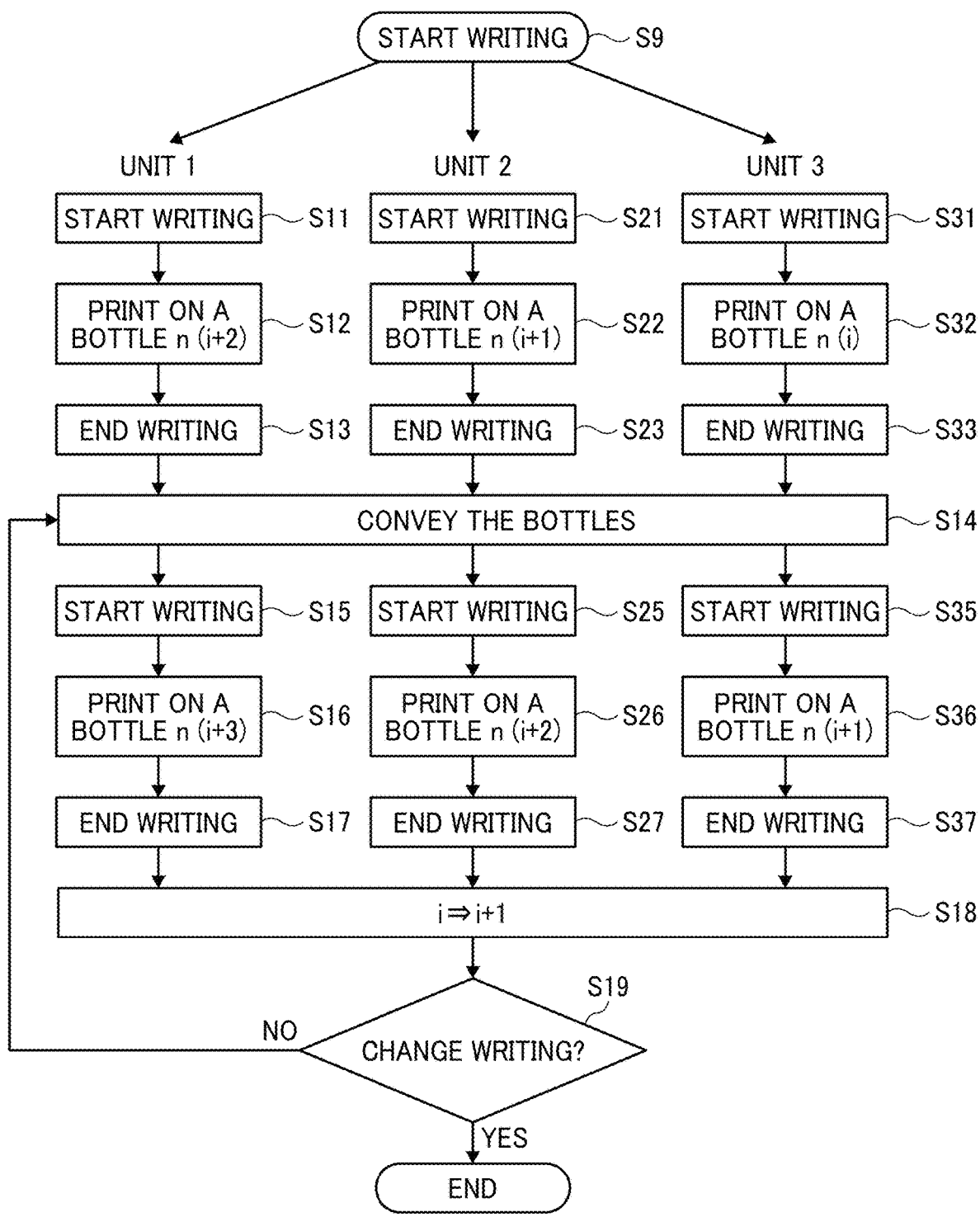
FIG. 13 is a flow chart of processing by the laser irradiation apparatus according to the present embodiment.

FIG. 13 is a flow chart of processing of the laser irradiation apparatus 500 (i.e., manufacturing apparatus) according to the present embodiment.

When the circuitry 400 (FIG. 6) starts writing (step S9), each of the writing units 310 to 330 starts writing (steps S11, S21, and S31), prints a pattern on the first to third irradiation regions of different containers 1 by irradiating with laser beams (steps S12, S22, and S32), which is "print on a bottle", and ends writing (steps S13, S23, and S33).

The circuitry 400 conveys the containers 1 such as bottles (step S14) by controlling the manufacturing line 200, starts writing by the writing units 310 to 330 (steps S15, S25, and S35), prints patterns on the first to third irradiation regions of different containers 1 by irradiating with laser beams (steps S16. S26, and S36), and ends the writing (steps S17, S27, and S37).

The circuitry 400 updates the order of the containers 1 (step S18). If there is no change in the printing in step S19, the processing returns to step S14 and repeats processing. If there is a change in the printing in step S19, the processing is ended.

As illustrated in FIG. 12B, each total time for printing per container by the first to third writing units 310 to 330 is 30 msec, 30 msec, and 33 msec, respectively.

The circuitry 400 (FIG. 6) starts writing for the third writing unit 330 (i.e., long-time irradiation unit), which is in step 31 in FIG. 13, having a longer laser irradiation time (i.e., long-time irradiation) among multiple irradiation units by irradiating the third irradiation region with a laser beam and starts writing for the first and second writing units 310 and 320 (i.e., short-time irradiation unit), which is in steps S1 and S21 in FIG. 13, having a shorter laser irradiation time (i.e., short-time irradiation) among multiple irradiation region by irradiating the first and second irradiation regions with laser beams.

The circuitry 400 ends writing for the first and second writing units 310 and 320 (steps S13 and S23 in FIG. 13) by stopping laser irradiation to the first and second irradiation regions and ends writing for the third writing unit 330 (step S33 in FIG. 13) by stopping laser irradiation to the third irradiation region. As a result, the total time in which the first to third irradiation regions are irradiated with the laser beams by the first to third writing units 310 to 330 is minimized.

In FIG. 7, the circuitry 400 synchronizes the timing of emitting the laser beam based on the detection signal from the photodetector that detects the position of the container 1 conveyed by the manufacturing line 200, and thus can irradiate the container 1 being stopped and the container 1 being transported with the laser beam.

As described above, the circuitry 400 controls the first writing unit 310 so that the first irradiation region in multiple irradiation regions is irradiated with a laser beam but the irradiation regions other than the first irradiation region in the multiple irradiation regions are not irradiated with laser beam, and controls the second writing unit 320 so that the second irradiation region included in multiple irradiation regions is irradiated with laser beam but the irradiation regions other than the second irradiation region in multiple irradiation regions are not irradiated with laser beam.

Accordingly, since patterns are formed by multiple writing units in multiple irradiation regions which do not overlap each other on the base 1a, productivity is improved as compared with a case where patterns are formed by a single writing unit.

Since the pattern is formed by the first writing unit 310 in the first irradiation region and the pattern is formed by the second writing unit 320 in the second irradiation region, the quality of the pattern in the irradiation region is uniform as compared with the case where multiple writing units form the patter in the first irradiation region, and the quality of the pattern is improved. Thus, a higher quality pattern can be formed on the base 1a with a higher productivity.

The circuitry 400 irradiates the first irradiation region of the first base 1a with the laser beam by the first writing unit 310 and irradiates the second irradiation region of the second base 1a with the laser beam by the second writing unit 320 so that the time in which the first writing unit 310 irradiates the first irradiation region of a first base 1a with the laser overlaps with the time in which the second writing unit 320 irradiates the second irradiation region of a second base 1a with the laser beam. Accordingly, the total time of the time in which the first irradiation region is irradiated with a laser beam by the first writing unit 310 and the time in which the second irradiation region is irradiated with a laser beam by the second writing unit 320 for the first base 1a and the second base 1a is reduced.

Although the first and second writing units 310 and 320 have been described above, the same applies to a case where a large number of writing units such as the third writing unit 330 are provided.

Figure 14:
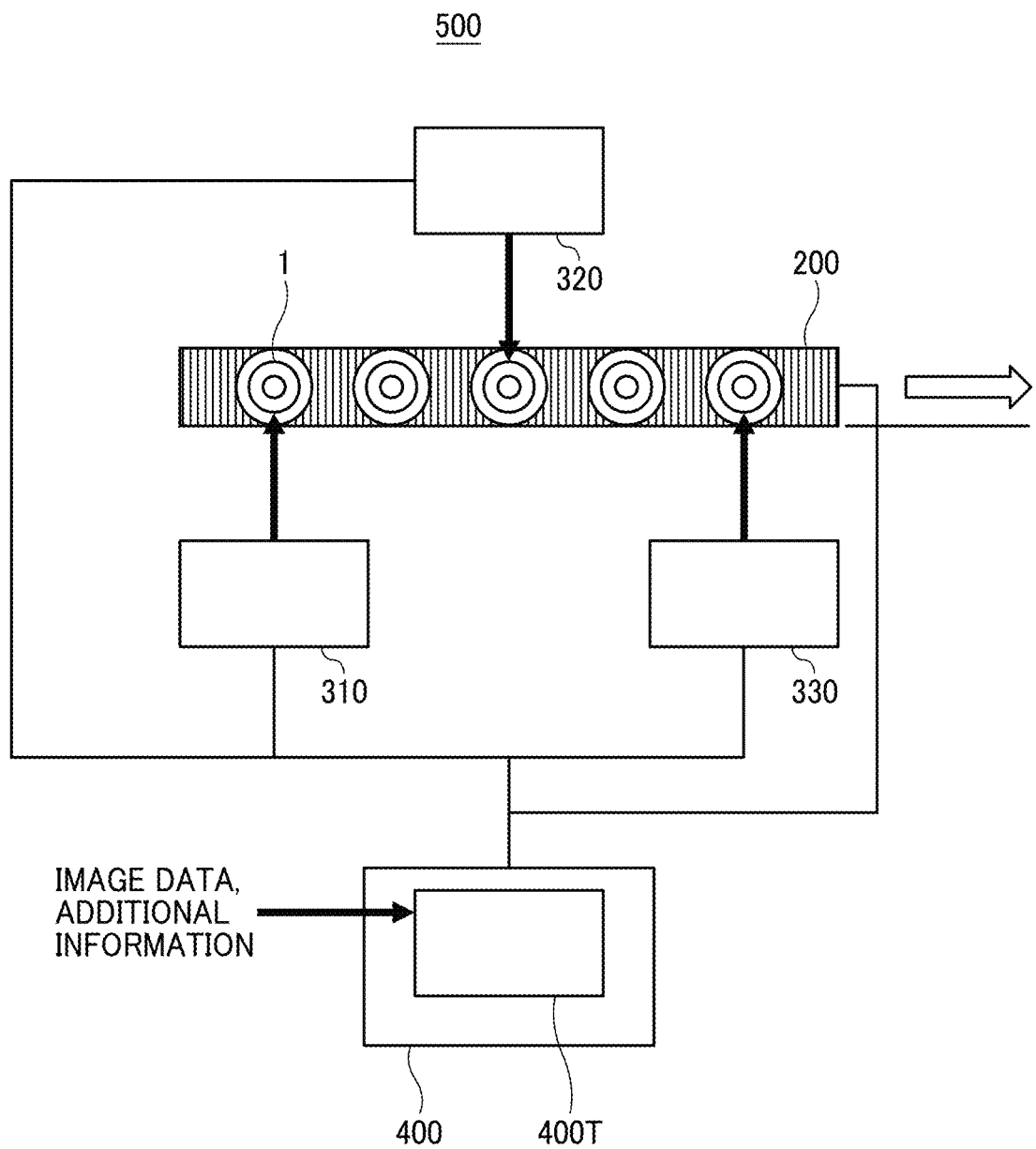
FIG. 14 is an illustration of a first modification of a laser irradiation apparatus according to the present embodiment.

FIG. 14 is an illustration of a first modification of the laser irradiation apparatus 500 (i.e., manufacturing apparatus).

The first modification of the laser irradiation apparatus illustrated in FIG. 14 is different from the embodiment illustrated in FIG. 6 in a configuration of the second writing unit 320 arranged on the opposite side of the manufacturing line 200 with respect to the first writing unit 310 and the third writing unit 330.

Figure 15:
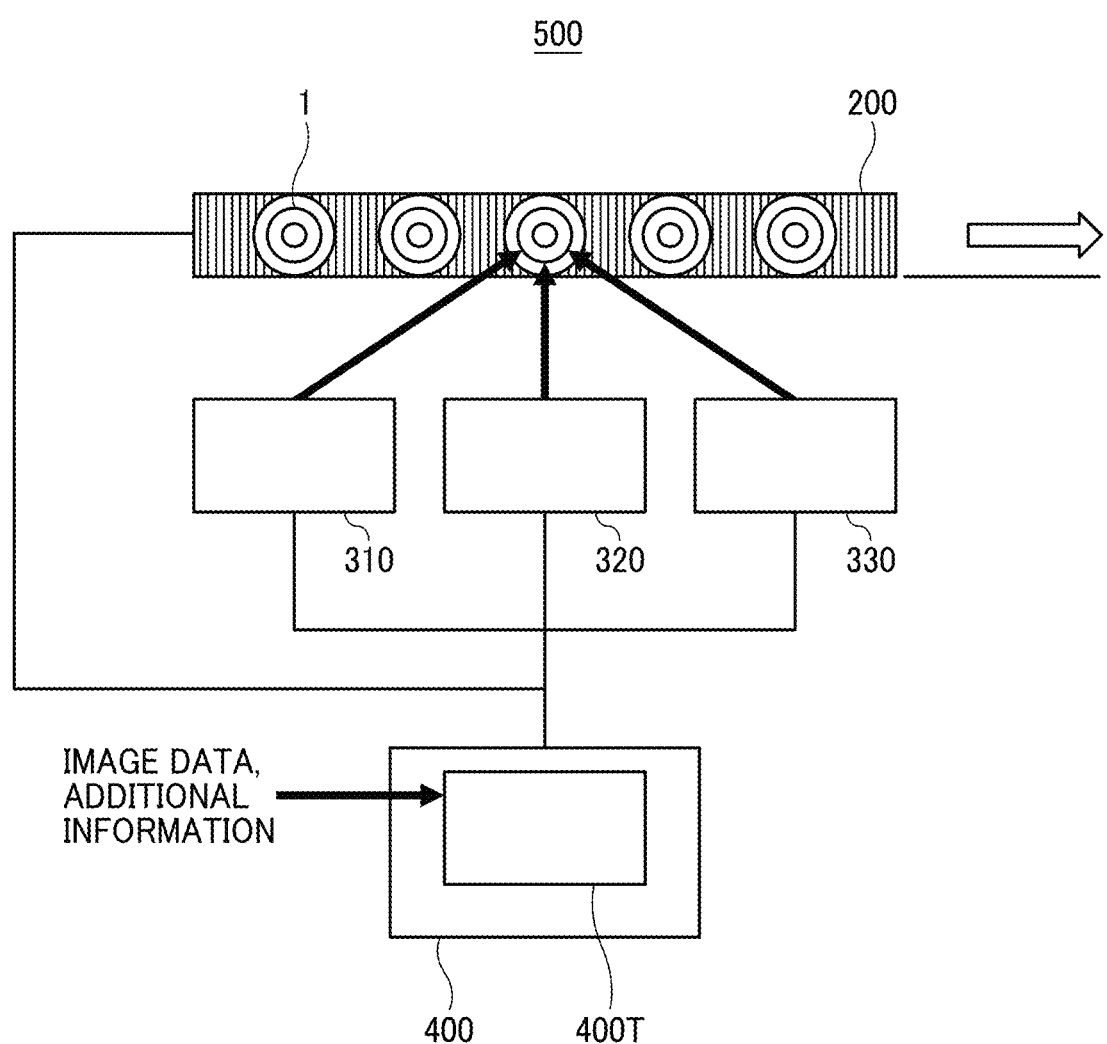
FIG. 15 is an illustration of a second modification of a laser irradiation apparatus according the present embodiment.

FIG. 15 is an illustration of a second modification of the laser irradiation apparatus 500 (i.e., manufacturing apparatus).

The second modification of the laser irradiation apparatus illustrated in FIG. 15 is different from the embodiment illustrated in FIG. 6. The first to third writing units 310 to 330 irradiate the container 1 with laser beams. The base includes multiple bases. Other respects of the second modification are similar to the embodiment illustrated in FIG. 6.

Figure 16:
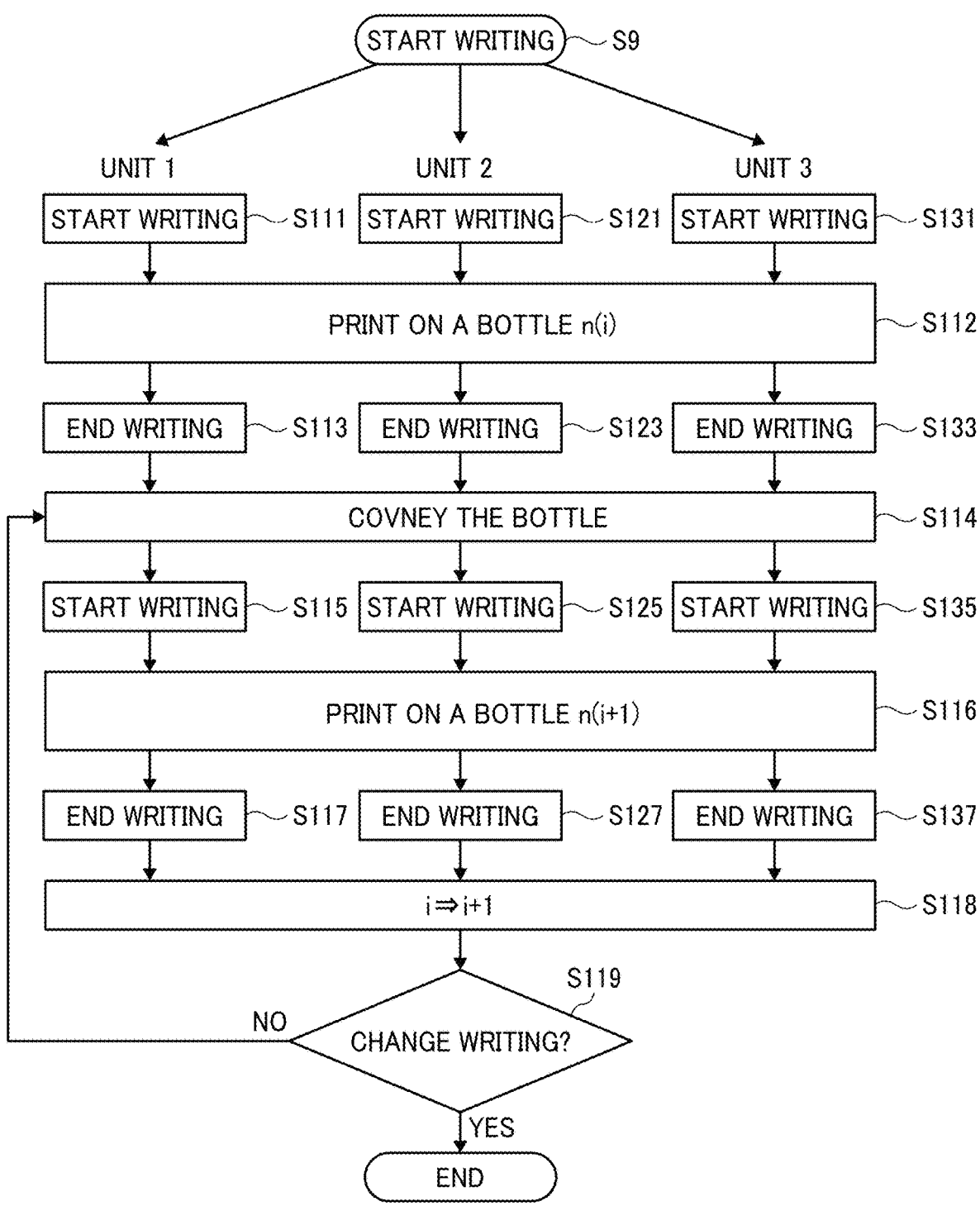
FIG. 16 is a flow chart of processing by the laser irradiation apparatus according to a second modification in FIG. 15.

FIG. 16 is a flow chart of processing of the laser irradiation apparatus 500 (i.e., manufacturing apparatus) according to a second modification. When the circuitry 400 starts writing (step S9), each of the writing units 310 to 330 starts writing (steps S111, S121, and S131), prints patterns by irradiating the first to third irradiation regions of the container 1 with laser beams (step S112), and ends writing (steps S113, S123, and S133).

The circuitry 400 convey the containers 1 by controlling the manufacturing line 200 (step S114), starts writing by each of the writing units 310 to 330 (steps S115, S125, and S135), prints patterns by irradiating the first to third irradiation regions of different containers 1 with laser beams (step S116), and ends writing (steps S117, S127, and S137).

The circuitry 400 updates the order of the containers 1 (step S118), returns to step S119 and repeats the processing if there is no change in the printing (step S114), and ends the process if there is a change in the printing (step S119).

The circuitry 400 (FIG. 15) starts writing for the third writing unit 330 (step 131 in FIG. 16) having a longer laser irradiation time among multiple irradiation units by irradiating the third irradiation region with a laser beam and starts writing for the first and second writing units 310 and 320 (steps S111 and S121 in FIG. 16) having a shorter laser irradiation time among multiple irradiation region by irradiating the first and second irradiation regions with laser beams.

The circuitry 400 ends writing for the first and second writing units 310 and 320 (steps S113 and S123 in FIG. 16) by stopping laser irradiation to the first and second irradiation regions and ends writing for the third writing unit 330 (step S133 in FIG. 16) by stopping laser irradiation to the third irradiation region.

The circuitry 400 irradiates the first irradiation region with the laser beam by the first writing unit 310 and irradiates the second irradiation region with the laser beam by the second writing unit 320 so that the time of irradiating the first irradiation region with the laser beam by the first writing unit 310 and the time of irradiating the second irradiation region with the laser beam by the second writing unit 320 match each other with respect to the identical base 1a of the container 1. Accordingly, the total time in which the first irradiation region is irradiated with a laser beam by the first writing unit 310 and the time in which the second irradiation region is irradiated with a laser beam by the second writing unit 320 with respect to the identical base 1a is reduced.

Embodiments of the present invention provides a laser irradiation apparatus 500 (i.e., manufacturing apparatus) includes: multiple writing units (i.e., multiple irradiation units) each to emit a laser beam to a surface of a base to form a pattern, multiple writing units (i.e., multiple irradiation units), including: a first writing unit 310 to emit a first laser beam; and a second writing unit 320 to emit a second laser beam; and a circuitry 400 to: control the first writing unit 310 to irradiate only a first irradiation region on a surface of a base 1a with the first laser; and control the second writing unit 320 to irradiate only a second irradiation region on the surface of the base 1a with the second laser beam. The first irradiation region and the second irradiation region are not overlapping each other. The first writing unit 310 is an example of a first irradiation unit, the second writing unit 320 is an example of a second irradiation unit, and the multiple writing units are an example of multiple laser irradiation units.

Accordingly, since patterns are formed by multiple writing units (i.e., multiple irradiation units) in multiple irradiation regions which does not overlap each other on the base 1a, productivity is improved as compared with a case where patterns are formed by a single writing unit.

Since the pattern is formed by the first writing unit 310 (i.e., first irradiation unit) in the first irradiation region and the pattern is formed by the second writing unit 310 (i.e., second irradiation unit) in the second irradiation region, the quality of the pattern in the irradiation region is uniformized as compared with the case where multiple writing units form the patter in the first irradiation region, and the quality of the pattern is improved.

Thus, a higher quality pattern can be formed on the base 1a with a higher productivity. As a result, the container 1 and the containment body including the base 1a having a higher quality pattern can be obtained with a higher productivity.

In the laser irradiation apparatus 500 (i.e., manufacturing apparatus), the circuitry 400 determines which one or more of the multiple subdivided regions 13A to 13E are included in the first irradiation region or the second irradiation region. The surface of the base al includes multiple subdivided regions 13A to 13E not overlapping each other.

Thus, the circuitry 400 sets a subdivided region that involves a pattern suitable for the first writing unit 310 (i.e., first irradiation unit) as the first region and another subdivided region that involves a pattern suitable for the second writing unit 320 (i.e., second irradiation unit) as the second irradiation region among the multiple subdivided regions 13A to 13E.

Specifically, the circuitry 400 may set the first writing unit 310 (i.e., first irradiation unit) so as to form a pattern that involves higher accuracy and takes a longer time to form and may set the second writing unit 320 (i.e., second irradiation unit) so as to form a pattern that does not involve higher accuracy and takes a shorter time to form.

The circuitry 40 sets one or more subdivided regions, in which a pattern is to be formed with a high accuracy, of the multiple subdivided regions 13A to 13E, to the first irradiation region. Further, the circuitry 400 sets one or more subdivided regions, in which a pattern is to be formed with a high speed, of the multiple subdivided regions 13A to 13E to the second irradiation region. As a result, a pattern having a higher accuracy is formed in the subdivided region in the first irradiation region, and a pattern is formed at higher speed in the subdivided region in the second irradiation region.

In the laser irradiation apparatus 500 (i.e., manufacturing apparatus), the circuitry 400 determines which one or more of the multiple subdivided regions 13A to 13E are included in the first irradiation region or the second irradiation region to minimize a difference between a laser irradiation time on the first irradiation region by the first writing unit 310 (i.e., first irradiation unit) and a laser irradiation time on the second irradiation region by the second writing unit 320 (i.e., second irradiation unit). As a result, the total time forming patterns in multiple subdivided regions 13A to 13E is minimized.

In the laser irradiation apparatus 500 (i.e., manufacturing apparatus), at least one irradiation unit of the multiple irradiation units is a long-time irradiation unit that performs a long-time irradiation, and at least another irradiation unit of the multiple irradiation units is a short-time irradiation unit that performs a short-time irradiation shorter than the long-time irradiation, and the circuitry 400 controls: the long-time irradiation unit to start the long-time irradiation before or at the same time as a start of the short-time irradiation of the short-time irradiation unit; and the short-time irradiation unit to end the short-time irradiation before or at the same time as an end of the long-time irradiation of the long-time irradiation unit. As a result, the total time in which the first to third irradiation regions are irradiated with the laser beams by the first to third writing units 310 to 330 is minimized.

In the laser irradiation apparatus 500 (i.e., manufacturing apparatus), the circuitry 400 controls the first writing unit 310 (i.e., first irradiation unit) to irradiate the first irradiation region with the first laser beam and the second writing unit 320 (i.e., second irradiation unit) to irradiate the second irradiation region with the second laser beam to cause an irradiation time of the first writing unit 310 (i.e., first irradiation unit) and an irradiation time of the second irradiation unit 320 (i.e., second irradiation unit) to overlap each other. Accordingly, the total time in which the first irradiation region is irradiated with a laser beam by the first writing unit 310 and the time in which the second irradiation region is irradiated with a laser beam by the second writing unit 320 with respect to the identical base 1a is reduced.

In the laser irradiation apparatus 500 (i.e., manufacturing apparatus), the base 1a includes a first base 1a and a second base 1a, and the circuitry 400 controls the first writing unit 310 (i.e., first irradiation unit) to irradiate the first irradiation region of the first base with the first laser beam and the second writing unit 320 (i.e., second irradiation unit) to irradiate the second irradiation region of the second base with the second laser beam to cause an irradiation time of the first writing unit 310 (i.e., first irradiation unit) and an irradiation time of the second writing unit 320 (i.e., second irradiation unit) to overlap each other. Accordingly, the total time of the time in which the first irradiation region is irradiated with a laser beam by the first writing unit 310 and the time in which the second irradiation region is irradiated with a laser beam by the second writing unit 320 for the first base 1a and the second base 1a is reduced.

Embodiments of the present invention provides a laser irradiation method including: controlling S8 the first writing unit 310 (i.e., first irradiation unit) to irradiate only a first irradiation region on a surface of a base 1a with the first laser beam to form a pattern in the first irradiation region; and controlling S8 the second writing unit 320 (i.e., second irradiation unit) to irradiate only a second irradiation region on the surface of the base 1a with the second laser beam to form a pattern in the second irradiation region. The first irradiation region and the second irradiation region are not overlapping each other. Thus, a higher quality pattern can be formed on the base 1a with a higher productivity. As a result, the container 1 and the container 1 including a content including the base 1a having a higher quality pattern can be obtained with a higher productivity.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A laser irradiation apparatus, comprising:
   a first irradiation source configured to emit a first laser beam to a surface of a container to form a first pattern including at least one of a character, a code, a figure or an image;
   a second irradiation source configured to emit a second laser beam to the surface of the container to form a second pattern including at least one of a character, a code, a figure or an image; and
   a circuitry configured to:
      control the first irradiation source to irradiate only a first irradiation region on the surface of the container with the first laser beam; and
      control the second irradiation source to irradiate only a second irradiation region on the surface of the container with the second laser beam, wherein
   the first irradiation region and the second irradiation region do not overlap,
   the first irradiation source is configured to form the first pattern and the second irradiation source is configured to form the second pattern using multiple different writing conditions, and
   each writing condition of the multiple different writing conditions corresponds to identification information.

2. The laser irradiation apparatus according to claim 1, wherein
   the surface of the container includes multiple subdivided regions not overlapping each other, and
   the circuitry is further configured to determine which one or more of the multiple subdivided regions are included in the first irradiation region or the second irradiation region.

3. The laser irradiation apparatus according to claim 2, wherein the circuitry determines which one or more of the multiple subdivided regions are included in the first irradiation region or the second irradiation region to minimize a difference between a laser irradiation time on the first irradiation region by the first irradiation source and a laser irradiation time on the second irradiation region by the second irradiation source.

4. The laser irradiation apparatus according to claim 1, wherein
   the first irradiation source is a long-time irradiation source that performs a long-time irradiation, and the second irradiation source is a short-time irradiation source that performs a short-time irradiation shorter than the long-time irradiation, and
   the circuitry is further configured to:
      control the long-time irradiation source to start the long-time irradiation before or at the same time as a start of the short-time irradiation of the short-time irradiation source; and
      control the short-time irradiation source to end the short-time irradiation before or at the same time as an end of the long-time irradiation of the long-time irradiation source.

5. The laser irradiation apparatus according to claim 1, wherein the circuitry controls the first irradiation source to irradiate the first irradiation region with the first laser beam and the second irradiation source to irradiate the second irradiation region with the second laser beam to cause an irradiation time of the first irradiation source and an irradiation time of the second irradiation source to overlap each other.

6. The laser irradiation apparatus according to claim 1, wherein
   the container includes a first surface and a second surface, and
   the circuitry controls the first irradiation source to irradiate the first irradiation region of the first surface with the first laser beam and the second irradiation source to irradiate the second irradiation region of the second surface with the second laser beam to cause an irradiation time of the first irradiation source and an irradiation time of the second irradiation source to overlap each other.

7. The laser irradiation apparatus according to claim 1, wherein the identification information identifies the first irradiation region as being any of a character region, a barcode region, a figure region, a picture region, and an identification mark region.

8. The laser irradiation apparatus according to claim 1, wherein the identification information identifies the second irradiation region as being any of a character region, a barcode region, a figure region, a picture region, and an identification mark region.

9. The laser irradiation apparatus according to claim 1, wherein the circuitry is further configured to control the first irradiation source to irradiate the first irradiation region according to the identification information.

10. The laser irradiation apparatus according to claim 1, wherein the circuitry is further configured to control the second irradiation source to irradiate the second irradiation region according to the identification information.

11. The laser irradiation apparatus according to claim 1, wherein the circuitry is further configured to manage image information in association with the identification information.

12. The laser irradiation apparatus according to claim 11, further comprising:
   a memory, wherein
      the circuitry is configured to store the image information in association with the identification information in the memory.

13. The laser irradiation apparatus according to claim 1, at least one writing condition of the multiple different writing corresponds to material properties of the surface of the container.

14. The laser irradiation apparatus according to claim 13, wherein the circuitry is configured to control the first irradiation source and the second irradiation source to form the pattern by irradiating the surface to change the material properties of the surface, causing yellowing, oxidation, melting, burning, vaporizing, deforming or other surface modification.

15. The laser irradiation apparatus according to claim 14, wherein the circuitry controls the first irradiation source and the second irradiation source to form multiple dots on the surface of the container, and the pattern being an aggregate formation of the multiple dots along any uneven portion, concave portion any convex portion of the container.

16. The laser irradiation apparatus according to claim 1, wherein at least one writing condition of the multiple different writing corresponds to geometry of the surface of the container.

17. The laser irradiation apparatus according to claim 16, wherein
   the circuitry is configured to control the first irradiation source and the second irradiation source to form the pattern by irradiating the surface to change the material properties of the surface, causing yellowing, oxidation, melting, burning, vaporizing, deforming or other surface modification, and
   the circuitry controls the first irradiation source and the second irradiation source to form multiple dots on the surface of the container, and the pattern being an aggregate formation of the multiple dots along any uneven portion, concave portion any convex portion of the container.

18. The laser irradiation apparatus according to claim 1, wherein the bottle is formed of polyethylene terephthalate (PET).

19. A laser irradiation apparatus, comprising:
   a first irradiation source configured to emit a first laser beam to a surface of a bottle to form a first pattern including at least one of a character, a code, a figure or an image;
   a second irradiation source configured to emit a second laser beam to the surface of the bottle to form a second pattern including at least one of a character, a code, a figure or an image; and
   a circuitry configured to:
      control the first irradiation source to irradiate only a first irradiation region on the surface of the bottle with the first laser beam; and
      control the second irradiation source to irradiate only a second irradiation region on the surface of the bottle with the second laser beam, wherein
   the first irradiation region and the second irradiation region do not overlap,
   the first irradiation source is configured to form the first pattern and the second irradiation source is configured to form the second pattern using multiple different writing conditions, and
   each writing condition of the multiple different writing conditions corresponds to identification information.

20. A laser irradiation apparatus, comprising:
   a first irradiation source configured to emit a first laser beam to a surface of a resin object to form a first pattern including at least one of a character, a code, a figure or an image;
   a second irradiation source configured to emit a second laser beam to the surface of the resin object to form a second pattern including at least one of a character, a code, a figure or an image; and
   a circuitry configured to:
      control the first irradiation source to irradiate only a first irradiation region on the surface of the resin object with the first laser beam; and
      control the second irradiation source to irradiate only a second irradiation region on the surface of the resin object with the second laser beam, wherein
   the first irradiation region and the second irradiation region do not overlap,
   the first irradiation source is configured to form the first pattern and the second irradiation source is configured to form the second pattern using multiple different writing conditions, and
   each writing condition of the multiple different writing conditions corresponds to identification information.

\* \* \* \* \*